United States Patent [19]

Thompson

[11] 4,377,852

[45] Mar. 22, 1983

[54] TERMINAL EMULATOR

[75] Inventor: E. Earle Thompson, Lubbock, Tex.

[73] Assignee: Texas Instruments Incorporated, Dallas, Tex.

[21] Appl. No.: 135,576

[22] Filed: Mar. 31, 1980

[51] Int. Cl.³ ............................................ G06F 7/00
[52] U.S. Cl. ................................................ 364/900
[58] Field of Search ... 364/200 MS File, 900 MS File, 364/300

[56] References Cited

U.S. PATENT DOCUMENTS

| | | | |
|---|---|---|---|
| 3,786,429 | 1/1974 | Goldman | 364/900 |
| 3,955,180 | 5/1976 | Hirtle | 364/200 |
| 3,995,258 | 11/1976 | Barlow | 364/200 |
| 4,063,221 | 12/1977 | Watson | 364/900 |
| 4,127,896 | 11/1978 | Raslavsky | 364/200 |
| 4,149,238 | 4/1979 | James | 364/200 |
| 4,153,937 | 5/1979 | Poland | 364/200 |
| 4,209,832 | 6/1980 | Gilham | 364/900 |

OTHER PUBLICATIONS

Bantz et al., Enhanced 1/0 Subsystem Using a Device Engine, IBM Tech. Disclosure Bulletin, vol. 19, No. 10, p. 4043, Mar. 1977.

*Primary Examiner*—James D. Thomas
*Assistant Examiner*—David Y. Eng
*Attorney, Agent, or Firm*—Melvin Sharp; Leo N. Heiting; Robert D. Marshall, Jr.

[57] ABSTRACT

A communications control system for enabling a small computer system, such as a personal computer, to emulate a terminal and thus to communicate with a remote system. Incoming data from the remote system is entered into a circular buffer on an interrupt basis. The communications control system alternately scans the circular buffer for newly entered data and the keyboard for operator generated messages. Any control characters are decoded and appropriate actions taken. Received alphanumeric characters are stored in a display memory for video display and in a system RAM for later retrieval and study. The display memory is optionally loaded in an intelligent wrap mode in which words are not broken on wrap around or a non-wrap mode which preserves the columns of the data as originally received. Scrolling controls enable the operator to enter a desired portion of the data stored in the system RAM into the display memory for viewing in either wrap-on or wrap-off modes. This invention also provides control of data transfer to and from the received line memory and local peripherals. In the preferred embodiment, the system is embodied by a plug in ROM module used with a compatible personal computer.

5 Claims, 13 Drawing Figures

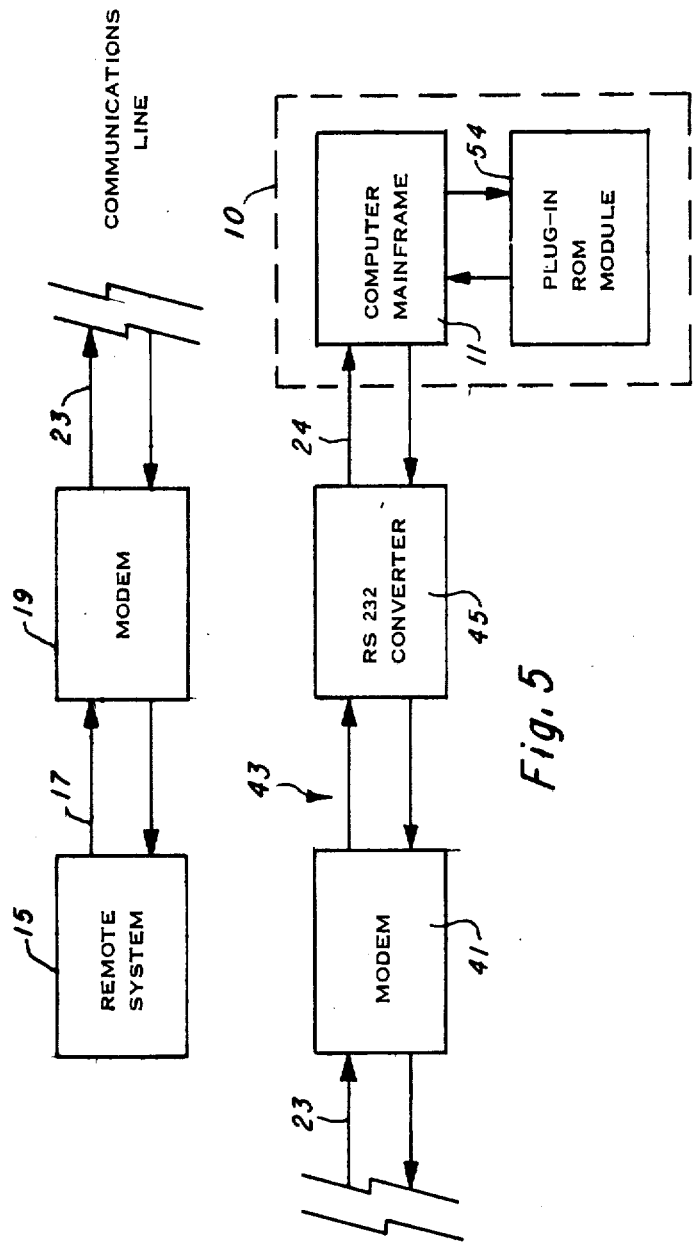
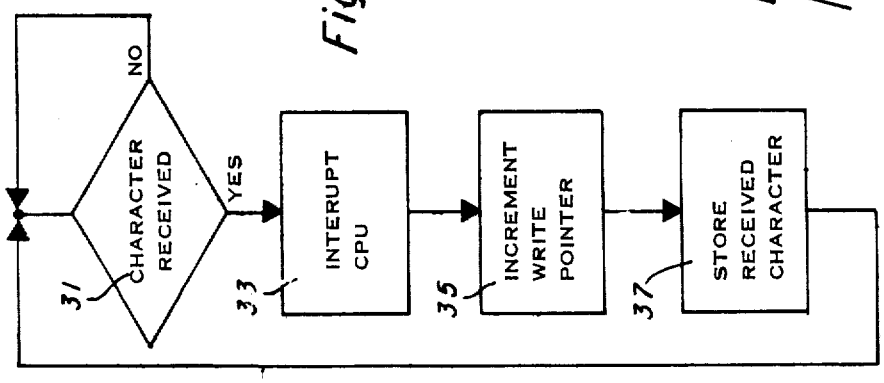

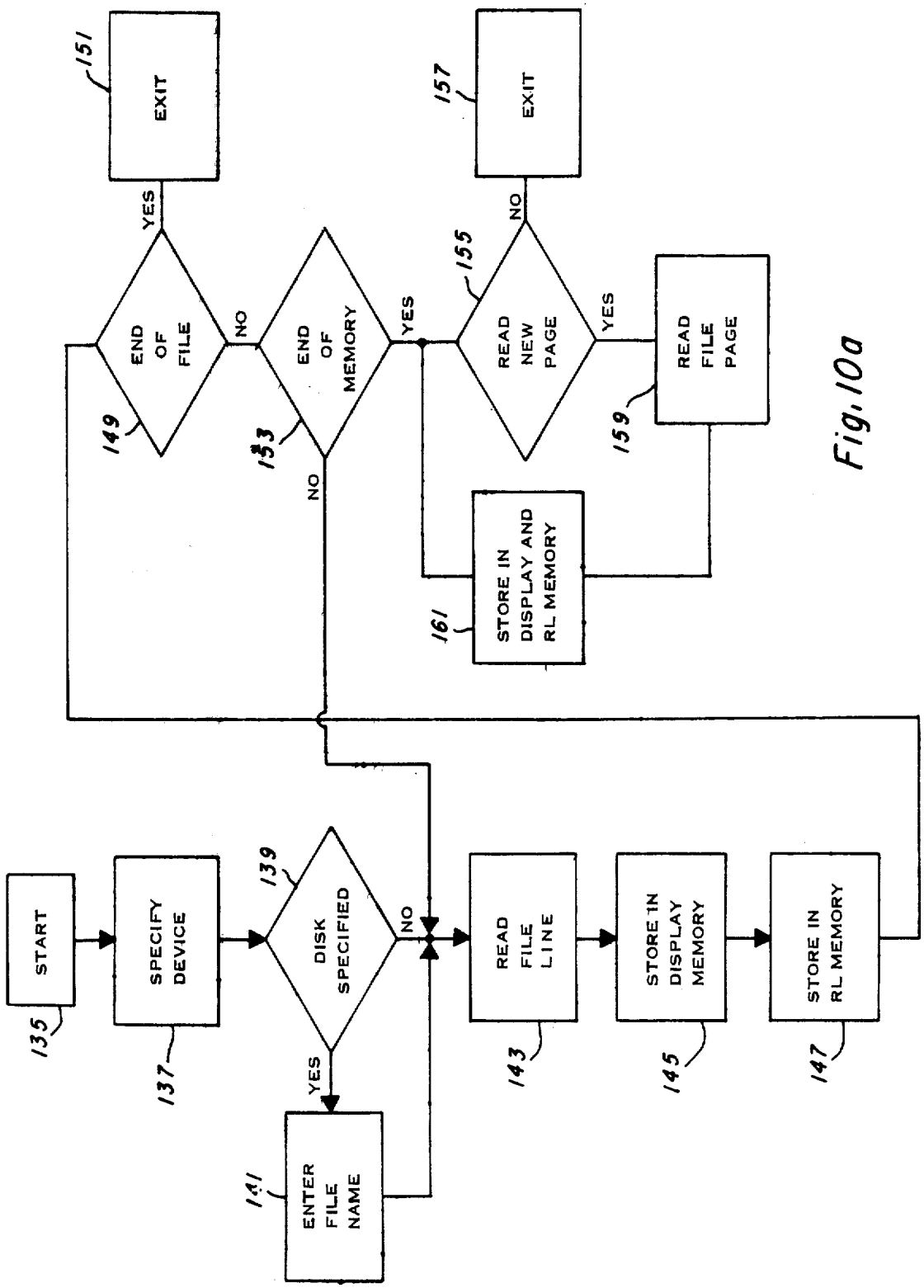

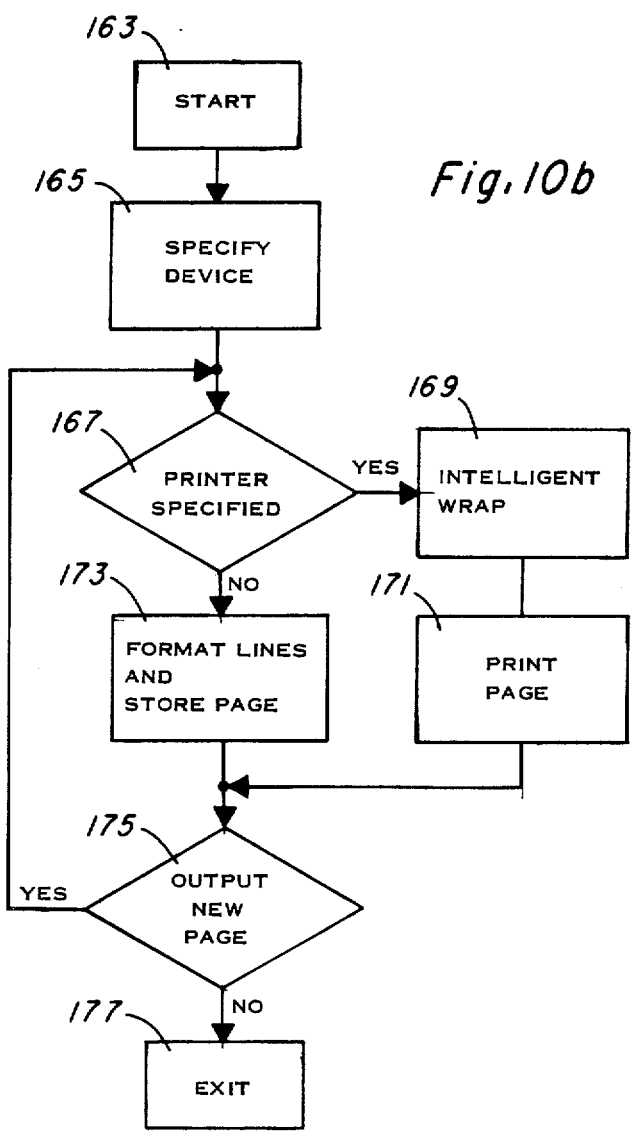

TERMINAL EMULATOR

BACKGROUND OF THE INVENTION

This invention stems from two developments in the field of data processing. On the one hand, there is a rise in the number and variety of subscription data base and computing services. Access to these subscription services is usually made via asynchronous communication over telephone lines using ASCII defined characters. Such communications require the user to have a terminal (such as a teletypewriter) and a modem (modulator-demodulator) to enable transmission and reception of ASCII characters on the telephone line. Most so-called "dumb" terminals (that is, terminals without any local data processing capacity) employ line lengths of at least 64 characters and most often use 80 character lines. For this reason, most current subscription services have their transmission formatted for line lengths of 64 characters or more.

The second development is the increase in the use of small computers, such as the Texas Instruments 99/4 Home Computer, for personal and small business use. These new computer users could often make advantageous use of the subscription data base and computing services to enable access to data necessary for their programs or to augment the limited processing capacity of their computers.

Direct communication between subscription data base and computing services and the small computer users is made difficult because these systems are not compatible. Many small computers use CRT displays in which the data is formatted in lines of 40 characters or less. These small computers are often not programmed to advantageously perform the two way asynchronous communications necessary to use the subscription services. The amount of data displayable on the CRT displays is severly limited in comparison with the print out capacity of the typical terminal. Thus the small computer should store received characters for later reading in many applications. Because the memory capacity of these small computers is often limited, maximum use of the available memory is required.

SUMMARY OF THE INVENTION

It is an object of the present invention to enable asynchronous communications between a remote system and a small computer.

In the preferred embodiment of the present invention, the above object and further objects are obtained by providing a plug-in read only memory module with appropriate data stored therein for attachment to and employment with a suitable small computer.

In the preferred embodiment of the present invention, the plug-in read only memory module includes an auto-incrementing address feature to enable more rapid data read out.

In the preferred embodiment of the present invention, the terminal emulator enables division of the memory of the small computer into a temporary data input buffer into which received data is stored on an interrupt basis, a display memory for storing data corresponding to characters displayed by a video display system and a received line memory. The terminal emulator provides memory control which reads data out of the temporary data input buffer for storage in the display memory and in the received line memory according to predetermined sequences. The memory control preferably also enables transfer of a subset of the data stored in the received line memory into the display memory, the subset being operator controlled. This feature enables review of data sent from the remote system even after disconnection of the communications link between the remote system and the small computer.

In the preferred embodiment of the present invention, the terminal emulator enables recognition of control characters received from the remote system when these characters are read out of the temporary input buffer. The terminal emulator then provides the format in the display memory indicated by the control character and provides the required data format and control character storage in the received line memory to duplicate the received data format by reading out the received line memory.

In the preferred embodiment of the present invention, the terminal emulator enters data into the display memory in two mode. In one mode, an intelligent wrap function is employed which prevents the break up of a word which extends beyond a display line by moving the entire word to the next display line. In the other mode, no intelligent wrap is used.

In the preferred embodiment of the present invention, the terminal emulator enables detection of a depressed key of a keyboard. Upon detection of such a depressed key the terminal emulator determines the meaning ascribed to the depressed key. If the depressed key corresponds to a transmittable character, the terminal emulator enables transmission of a signal to the remote system indicating the transmittable character.

It is another object of the present invention to provide a data transfer control between data received by the remote system, data stored in the small computer and local peripheral device such as a mass memory storage system or a printer.

In the preferred embodiment of the present invention, the terminal emulator enables operator selectable data transfer formatting for at least a disk unit, a magnetic tape unit and a printer. The terminal emulator generates the proper signals for transmission of data stored in the received line memory to the operator selected device. The terminal emulator formats the data sent to the printer in an intelligent wrap manner taking into account the number of columns in the print lines to prevent breakup of a word at the end of a print line. This intelligent wrap is achieved by looking forward in the received line memory at a memory location corresponding to the end of a print line prior to sending data to the printer. If a line would otherwise have ended in the middle of a word, the terminal emulator reformats the data to place that entire word at the beginning of the following lines. The terminal emulator also provides any necessary translation of data received from a local peripheral into the form stored in the received line memory.

BRIEF DESCRIPTION OF THE DRAWINGS

The structure and operation of the terminal emulator of the present invention will become clear from the foregoing detailed description taken in conjunction with the drawings, in which:

FIG. 5 is a block diagram of a typical asynchronous digital communications system in which the terminal emulator of the present invention may be employed;

FIG. 6 is a flow chart illustrating the logical operation of the interrupt receiving program of one embodiment of the terminal emulator;

FIGS. 10a and 10b are flow charts illustrating the logical operation of the local peripheral input and output programs.

DETAILED DESCRIPTION OF THE PREFERRED EMBODIMENT

Figure 1A:
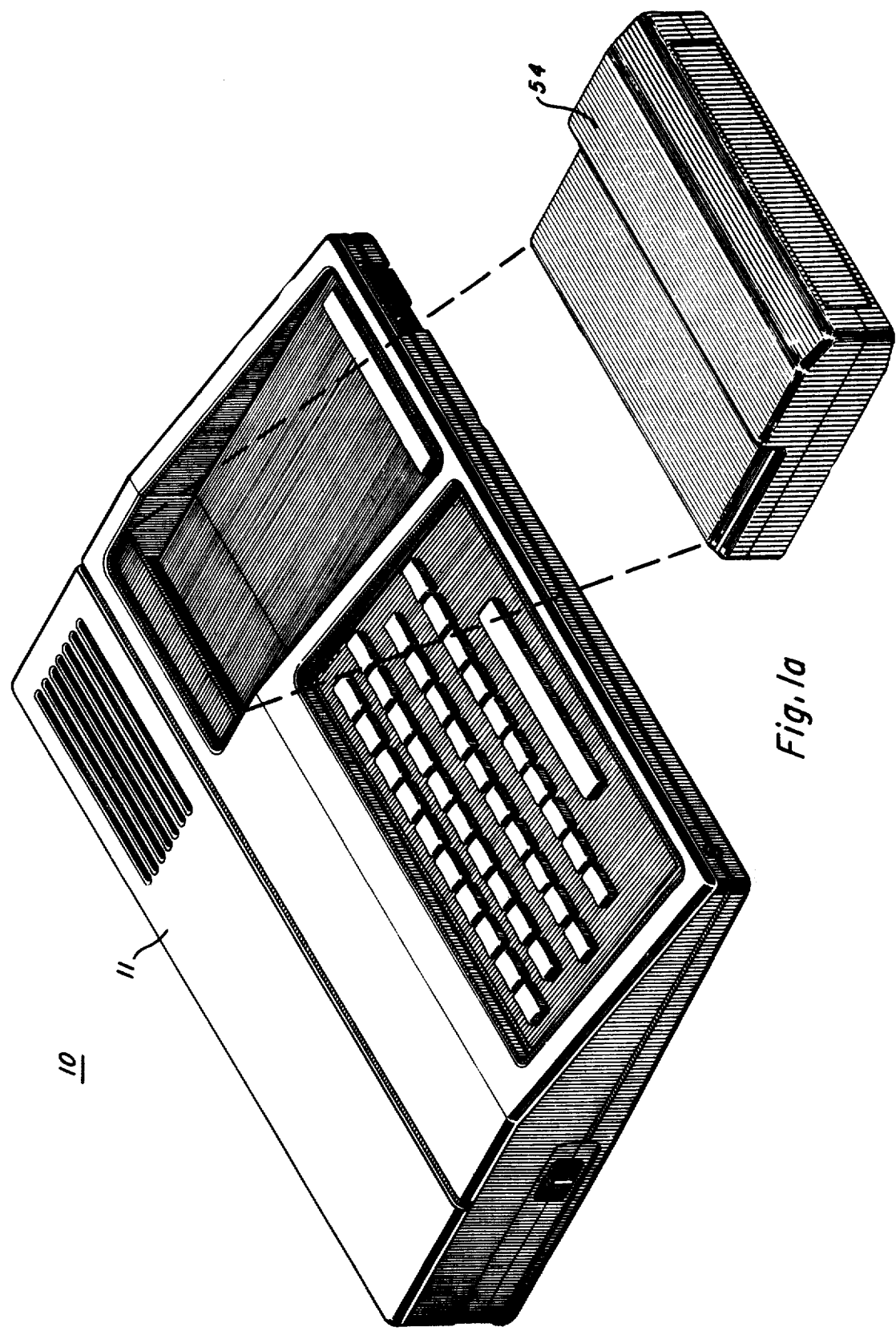
FIGS. 1a and 1b illustrate a typical small computer system including a ROM library module which may embody the present invention.

FIG. 1a illustrates the physical structure of the preferred embodiment of the terminal emulator of the present invention. Digital computing system 10 includes computer mainframe 11 and plug-in ROM library module 54. ROM library module 54 plugs into computer mainframe 11 in the manner illustrated in the dashed lines.

Figure 1B:
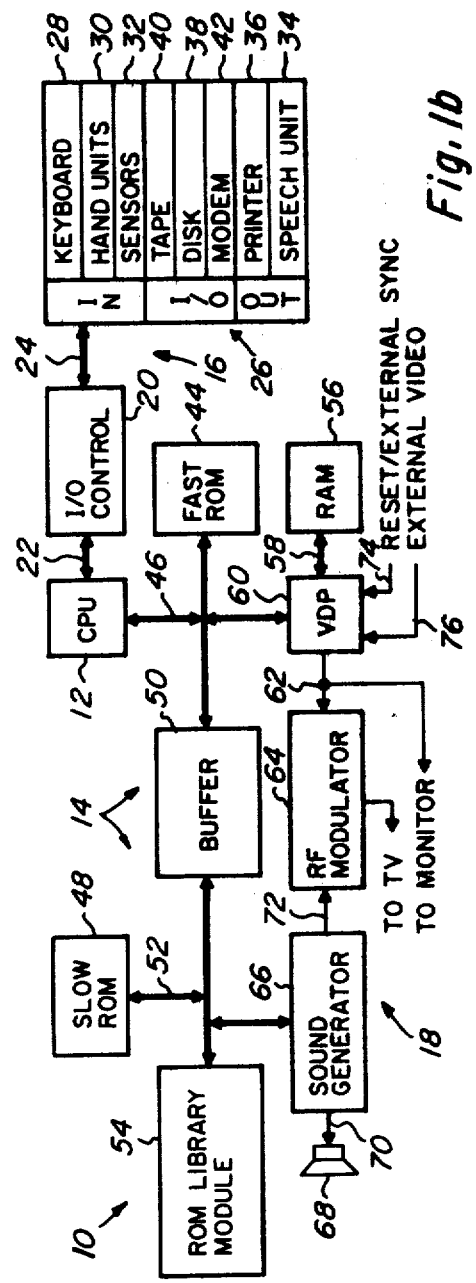

Shown in FIG. 1b is a digital computing system 10 incorporating the preferred embodiment of the present invention. In general, the digital computing system 10 is comprised of a central processing unit (CPU) 12, a memory subsystem 14, an input/output (I/O) subsystem 16, and a video display subsystem 18. The CPU 12, which may be a monolithic microprocessor such as the Texas Instruments 9985, operates in a conventional manner under the control of digital control programs stored in the memory subsystem 14, usually in response to processing requests initiated via the input/output subsystem 16. In the input/output subsystem 16, an I/O control unit 20, which may be a monolithic integrated circuit such as the Texas Instruments 9901, operates in a conventional manner to interface a CPU communication bus 22 to an I/O bus 24 connected to one or more I/O units 26. By way of example, the I/O units 26 may be such conventional devices as the following: input devices, including a keyboard 28, a plurality of hand-held units 30, and various types of remote sensors 32; output devices, such as a speech synthesizer unit 34 and a hard copy printer 36, and bidirectional input and output devices such as a magnetic disk unit 38, a magnetic tape unit 40, and a communication modem 42.

In the memory subsystem 14, it is frequently desirable to combine a quantity of read only memory (ROM) with a quantity of read/write, random access memory (RAM). In such a configuration, support programs, such as a suitable operating system and a desired assembler or compiler, are stored in the ROM, while user programs and volatile data are stored in the RAM. In this form, the relatively static programs and data are maintained in the relatively less expensive ROM, so that only the relatively transient program and data need be stored in the generally more expensive RAM.

In the preferred form shown in FIG. 1b, the memory subsystem 14 is also configured to take advantage of the low cost of relatively slow ROM and of dynamic RAM, without substantially degrading the performance of the CPU 12. More particularly, in the ROM portion of memory subsystem 14, a relatively limited amount of fast ROM 44, preferably of the N channel MOS type, such as the Texas Instruments 4732, is directly connected to the CPU 12 via a CPU memory bus 46, while a larger amount of relatively slow ROM 48, preferably of the P channel MOS type, such as the Texas Instruments 0430, is connected to the CPU 12 via a bus buffer 50, such as the Texas Instruments 74LS245, interposed between the CPU memory bus 46 and an auxiliary bus 52. By providing each device comprising the slow ROM with an internal auto-incrementing address counter, the CPU overhead associated with sequentially accessing the slow ROM 48 is greatly reduced. If, in addition, each of the devices comprising the slow ROM 48 is assigned a unique ROM address page number, as in the 0430, an additional plurality of such devices may be incorporated to form a ROM library module 54 for connection to the auxiliary bus 52 via a suitable plug-in type port.

In the RAM portion of the memory subsystem 14, a block of dynamic RAM 56, preferably of the N Channel MOS type such as the Texas Instruments 4027, is connected via RAM bus 58 to the CPU memory bus 46 via a video display processor (VDP) 60. More particularly, the VDP 60 is constructed to provide in addition to other functions to be described below, an auto-incrementing address counter capability, similar to that incorporated in the devices comprising the slow ROM 48. In addition, the VDP 60 provides for the periodic refreshing of the contents of the various devices comprising the RAM 56. Thus, the CPU 12 is relieved of the burden of supplying addresses for each of a series of sequential accesses to the RAM 56, and of the considerable overhead normally associated with the periodic refreshing of dynamic random access memory.

In the video display subsystem 18, the VDP 60 may be activated by the CPU 12 via the CPU memory bus 46 to generate all video, control and synchronization signals necessary for the display on a raster-scanned television unit of a set of display data previously generated by the CPU 12 and stored in the RAM 56. The resultant composite video signal is provided via a signal path 62 for application either to a dedicated monitor unit or to a conventional RF modulator 64 before application to a conventional television receiver. In the preferred form, a sound generator 66, such as the Texas Instruments 9919, is connected to the CPU 12 via the auxiliary bus 52 and provides a CPU-controlled audio signal which may be applied to an auxiliary speaker 68 via a signal path 70 or to the RF modulator 64 via a signal path 72 for mixing with the composite video signal provided by the VDP 60.

The facilitate system initialization and synchronization, it is preferred that the VDP 60 respond to a manual reset or an external synchronization signal on a signal path 74, by placing the various control portions thereof in a known state. Similarly, it is considered desirable that the VDP 60 be capable of receiving an externally produced, composite video signal via a signal path 76, and mixing the external video signal with the internally-generated composite video signal for output via the signal path 62. For example, it may be desirable in some circumstances to combine the composite video signal generated by the VDP 60 with a composite video signal produced via an auxiliary television camera or derived from a broadcast television signal. In such a configuration, the VDP may be conveniently synchronized with the external video source by extracting in a conventional manner appropriate synchronizing portions of the external video signal on the signal path 76 for application to the VDP 60 via the signal path 74. As will be readily apparent to those skilled in the art, the external video input and synchronization capability of the VDP also facilitates the chaining of two or more VDP 60 devices, to greatly enhance the data display and animation capabilities of the digital computing system 10.

GENERAL DESCRIPTION OF THE VIDEO DISPLAY PROCESSOR

Figure 2:
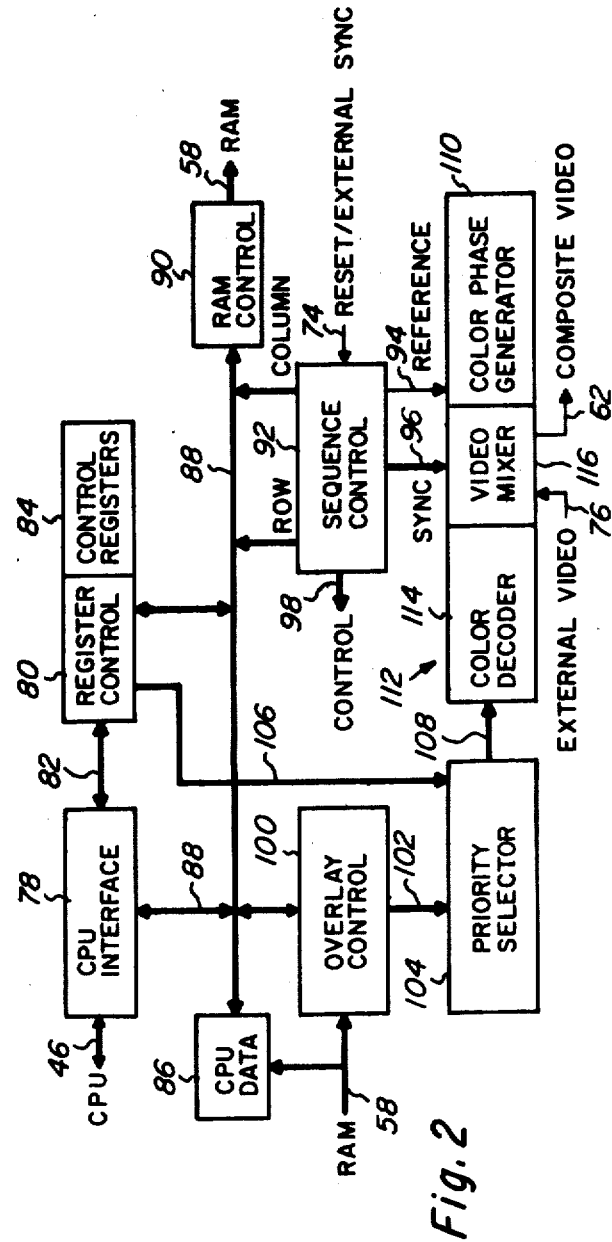
FIG. 2 is a block diagram of the video display processor of the small computer system illustrated in FIG. 1.

Shown in FIG. 2 is a block diagram of the circuit comprising the video display processor 60 shown in FIG. 1. In general, the VDP 60 is constructed to operate in both a RAM controller mode and in a video controller mode, with substantial simultaneity occurring between these modes. In addition, much of the circuitry for accomplishing the RAM controller functions may be conveniently employed, together with additional circuitry, for accomplishing the video controller functions. In this manner, substantial savings in time and circuitry are realized.

In general, a CPU interface 78 responds to access requests from the CPU 12 via the CPU memory bus 46. When a CPU access request is initially received, the CPU interface 78 transfers the selected RAM address to a register control 80 via a register bus 82 for storage in a particular one of a set of control registers 84. In the case of a write request, the CPU interface 78 then latches the write data from the CPU memory, bus 46 into a CPU data register 86 via a VDP address and data bus 88, and initiates a CPU write access request for service by a RAM control 90. In response to the write request, the RAM control 90 will retrieve the RAM address from the control registers 84 via the register control 80, and pass the RAM address to the RAM 56 via the RAM bus 58. Thereafter, the RAM control 90 will transfer the write data from the CPU data register 86 to the RAM 56 via the RAM bus 58. In the case of a read request, the CPU interface 78 will simply initiate a CPU read access request for service by the RAM control 90. As in the case of a write request, the RAM control 90 then transfers the RAM address from the control registers 84 to the RAM 56. Thereafter, the RAM control 90 cooperates with the RAM 56 to latch the read data provided by the RAM 56 via the RAM bus 58 into the CPU data register 86. When the CPU 12 calls for the data, the CPU interface 78 transfers the read data provided by the CPU data register 86 on the VDP address and data bus 88 to the CPU 12 via the CPU memory bus 46.

As soon as a write request has been serviced, the RAM control 90 will automatically increment the RAM address contained in the control registers 84, so that a subsequent CPU write access request can be made into the next sequential address location in the RAM 56 merely by transferring the write data from the CPU 12 into the CPU data register 86 via the CPU interface 78. Similarly, the RAM control 90 will automatically increment the RAM address contained in the control registers 84 after a read request has been serviced, so that a subsequent CPU read access request can be made from the next sequential address location in the RAM 56 as soon as the CPU interface 78 has completed the transfer of the preceeding read data to the CPU 12. Thus, the CPU 12 spends a minimum amount of time waiting for a data transfer after an access request is issued.

When a VDP register access is received, the CPU interface 78 transfers the address of the particular one of the set of control registers 84 to the register control 80 via the register bus 82. In the case of a register write request, the CPU interface 78 transfers the write data from the CPU memory bus 46 to the register bus 82, for subsequent latching into the selected control register 84 via the register control 80. In the case of a register read request, the register control 80 connects the selected control register 84 to the register bus 62, with the CPU interface 78 subsequently connecting the register bus 82 to the CPU memory bus 46.

When the VDP 60 is operating in the RAM controller mode only, the RAM control 90 operates in a conventional manner to periodically access each of the refresh segments in the RAM 56. Thus, RAM contents are protected in the event that the CPU 12 fails to exercise each of the refresh segments through normal RAM accesses.

In the video controller mode, the VDP 60 generates a composite video signal in accordance with a set of control parameters established in the control registers 84, using a set of display data arrays stored in the RAM 56. In general, the composite video signal, when displayed on a suitable video display unit, produces a video display image comprised of M columns of N rows of individual, discrete video display elements or pixels. For convenience of information display, however, the (M×N) pixels may be considered as being logically associated into smaller contiguous groups or blocks which may be configured or defined to form discernible characters of "patterns", as in conventional character generations. In addition, however, the preferred form of the VDP 60 accommodates a plurality of mobile blocks or "sprites" which may be freely moved relative to the fixed display image by defining or selecting a particular column U and row V at which the upper left corner of the sprite is to be displayed. Thus, the VDP 60 generates the composite video signal in synchronization with the instantaneous column X and row Y position of the raster scan so as to display either the fixed patterns or the mobile sprites, as appropriate.

In the preferred form, the VDP 60 operates in a text mode. In the text mode, the VDP 60 generates a 40 column, 24 row image of patterns (6×8 pixels) selected from a pattern generator table (256 pattern definition blocks) according to a pattern name table (960 pattern names). The VDP 60 provides a selection of 16 distinct colors, including white, gray, black and a special transparent state to be described in greater detail below.

During system initialization and as required thereafter, the VDP 60, operating in the memory controller mode, cooperates with the CPU 12 to establish in the RAM 50 the appropriate display data arrays. To enable the VDP 60 to operate in the text mode, the CPU 12 should store in the RAM 56 the pattern table relied upon by the VDP 60. In particular, the pattern generator table comprises a plurality of consecutive pattern definition blocks, each consisting of 8, 6-bit bytes, which define the bit patterns for each individual pattern, as in conventional character generators. In contrast, the pattern name table consists of a row-by-column ordered array of pattern names which map the pattern definition blocks into each of the 40 columns of 24 rows of patterns comprising a full screen video pattern image. In addition, a pattern color table establishes a pair of video color codes associated with each of 32 contiguous sets of 8 pattern definition blocks of the pattern generator table, with each of the video color codes corresponding to a particular one of the sixteen available colors. Thus, the pattern name table, the pattern generator table, and the pattern color table represent an ordered array whereby the individual bits comprising a pattern definition block map the video color codes assigned via the pattern color table into each of the M columns of N rows of pixels comprising a full screen video pattern image.

In general, a sequence control 92 operates in a conventional manner to maintain a cyclic column count X and a cyclic row count Y indicative of the time sequential position of the raster scan of the video display unit. As will be clear to those skilled in the art, only a portion of the total raster scan period is devoted to actively displaying patterns on the video display unit, since a portion of each row of horizontal scan is devoted to horizontal retrace, while a number of complete row and horizontal scans are required to perform vertical retrace and related synchronization. However, at least during the active display period, the sequence control 92 makes the column count X and the row count Y available via the VDP address and data bus 88. The sequence control 92 also provides a color reference signal having a frequency related to the NTSC 3.57 MHz carrier, via a signal path 94, and a set of sync signals of substantially conventional form via a sync bus 96. In response to the reset/external sync signal on the signal path 74, the sequence control 92 clears the column and row counts, and generally synchronizes the color reference signal and the sync signals with the external source. In the preferred form, the sequence control 92 is comprised of a clock circuit of conventional form, and a pair of control programmable logic arrays (PLA's) for providing various control signals via a control bus 98 depending on the current column and row counts.

An overlay control 100, responsive to the column and row counts, periodically requests the RAM control 90 to retrieve selected portions of the pattern table from the RAM 56. As the display data is provided by the RAM 56 via the RAM bus 58, the overlay control 100 receives the pattern data, and provides a pattern signal via a pattern bus 102, comprising the bit in the pattern generator table which maps the pixel in the column X of the row Y of the video pattern image when $1 \leq X \leq M$ and $1 \leq Y \leq N$. In addition, the overlay control 100 receives the video color codes assigned to each pattern during the display thereof. In other words, the overlay control 100 processes the pattern data arrays so as to provide the proper bit patterns for each of the selected patterns during the entire period that the display is active.

Each pattern signal, and the associated video color code, are applied to a priority selector 104 via the pattern bus 102. In response to receiving only the pattern signal, the priority selector 104 will select a respective one of the video color codes associated with the pattern signal, depending upon the current digital value thereof. If no pattern signal is being received, the priority selector 104 will generally select a default video color code provided by one of the control registers 84 via a default color bus 106. In each case, the video color code corresponding to the current selected pattern signal is provided via a color bus 108 as a video control signal.

A color phase generator 110, which forms a portion of a composite video generator 112, receives the color reference signal provided by the sequence control 92 via signal path 94, and generates the six NTSC color phase signals, each phase shifted by a predetermined amount relative to the color reference signal. In a color decoder 114, the video color codes, comprising the video control signal provided by priority selector 104 via the color bus 108, are decoded, and applied to a video mixer 116, together with the color phase signals provided by the color phase generator 110. In the video mixer 116, each of the video color codes decoded via the color decoder 114 selectively couples a complimentary pair of the color phase signals to a gating network to generate the information portion of a composite video signal for output via the signal path 62. In addition, the video mixer 116 receives the sync signals provided by the sequence control 92 via the sync bus 96, and generates the standard horizontal, vertical and color burst portions of the composite video signal in response thereto. In the preferred form, the video mixer 116 may be placed in an external video mode wherein an external video signal received via the signal path 76 is selectively merged with the internally-generated composite video signal for output via the signal path 62.

DESCRIPTION OF THE ROM LIBRARY MODULE

Figure 3:
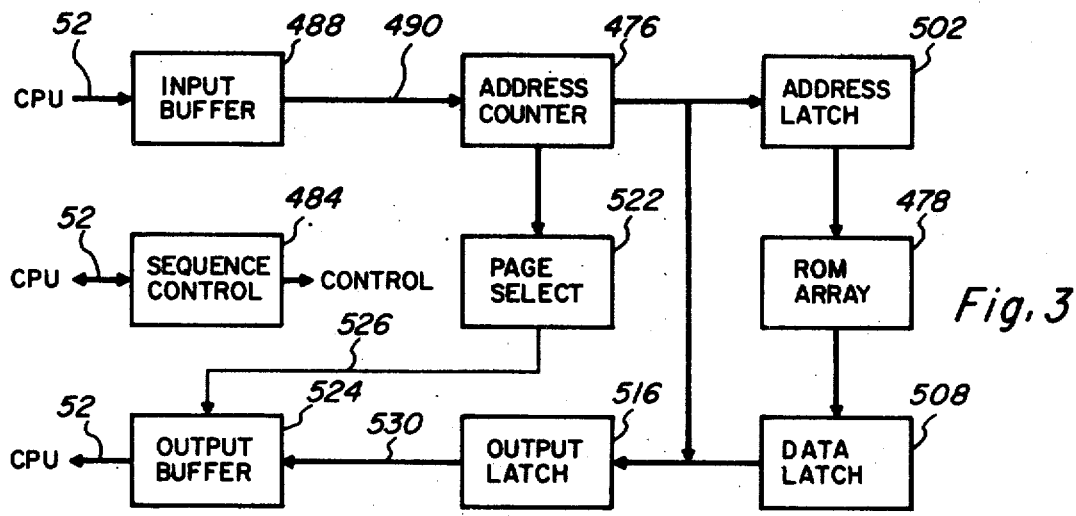
FIG. 3 is a block diagram of a typical ROM library module.
Figure 4:
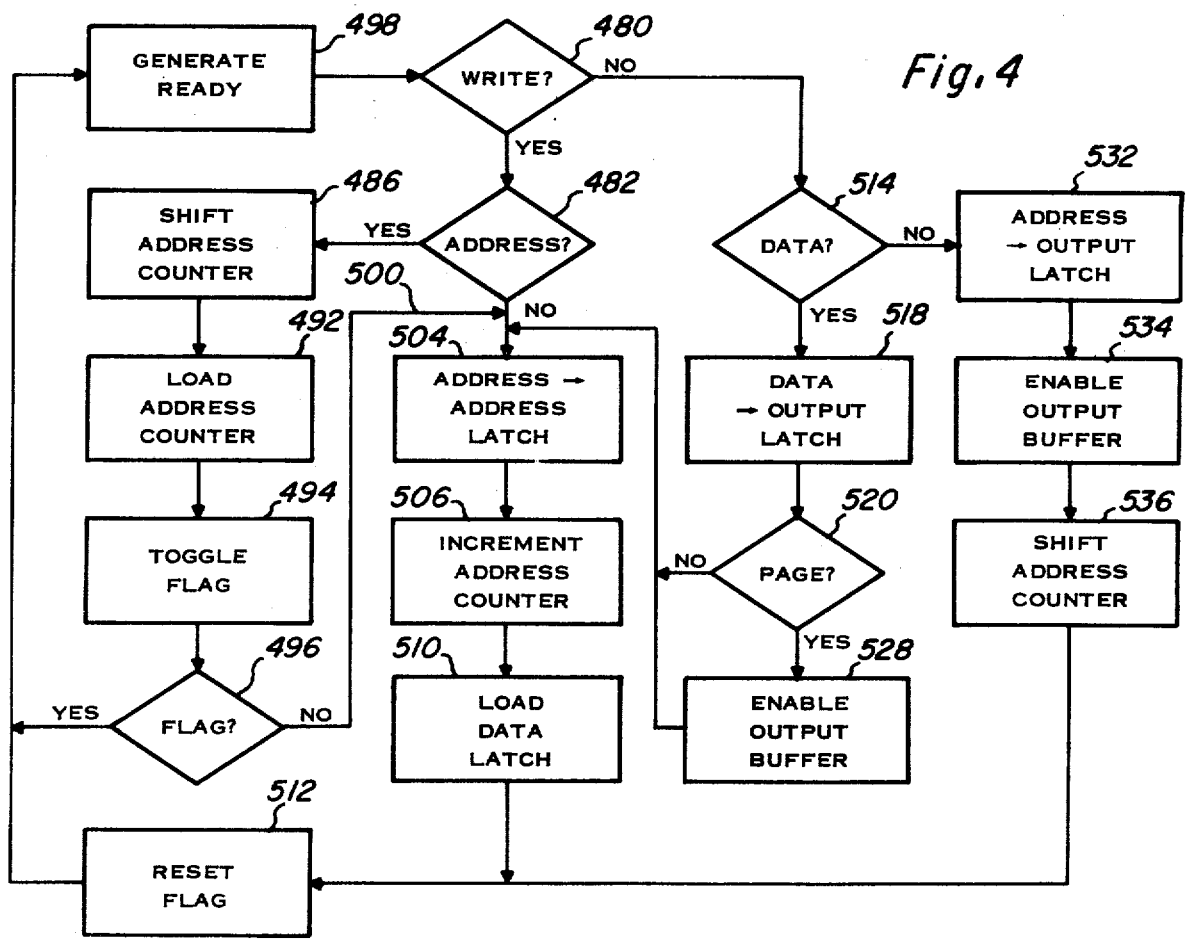
FIG. 4 is a flow chart illustrating the logical operation of the ROM library module illustrated in FIG. 3.

Shown in FIG. 3 is a block diagram illustrating the operation of each discrete device comprising the slow ROM 48 (FIG. 1), generally in accordance with the logic diagram shown in FIG. 4. In general, the ROM 48 is responsive to ROM access requests provided by the CPU 12 via the memory bus 46, and coupled to the auxiliary bus 52 via the bus buffer 50. In particular, the CPU 12 may write a new address into an address counter 476 in the ROM 48, read the address currently in the address counter 476, or read the data contained in a ROM array 478 at the address contained in the address counter 476. In the preferred form, the ROM array 478 contains 6144 8-bit bytes of processing information, each of which is sequentially or randomly addressable via the lower 13 bits of a 16 bit address. The upper 3 bits of the 16 bit address comprise a page designation which specifies a desired one of eight individual devices comprising the ROM 48, in the manner set forth below.

In response to receiving a write (decision block 480) address (decision block 482) ROM access request from the CPU 12 generally via the auxiliary bus 52, a sequence control 484 prepares to receive the first 8 of the 16 bits comprising the new address by shifting the address bits contained in the lower 8 bit positions of the address counter 476 into the upper 8 bit positions thereof (processing block 486). When the first 8 address bits of the new address become available on the auxiliary bus 52, the sequence control 484 enables an input buffer 488 and loads the first 8 address bits into the lower 8 bit positions of the address counter 476 via an input bus 490 (processing block 492). To "remember" that the first 8 bits of the new address have already been loaded, the sequence control 484 toggles an internal flag (processing block 494). If, as a result, the flag is in the set state (decision block 496), the sequence control 484 will generate a ready signal (processing block 498) for application to the CPU 12 via the auxiliary bus 52, indicating that the ROM 48 is ready to receive the second 8 bits of the address.

Upon receiving a second write (decision block 480) address (decision block 482) ROM access request, the sequence control 484 will shift the first 8 bits of the new address from the lower 8 bit positions of the address counter 476 into the upper 8 bit positions thereof (processing block 486). When the second 8 bits of the new address are provided by the CPU 12 via the auxiliary bus 52, the sequence control 484 will enable the input buffer 488 and load the second 8 bits of the new address into the lower 8 bit positions in the address counter 476 via the input bus 490 (processing block 492). If, after the flag has been toggled a second time (processing block 494), the flag is in the reset state (decision block 496), the sequence control 484 will perform an auto-incrementing procedure 500.

In the auto-incrementing procedure 500, the sequence control 484 will load the address currently contained in the address counter 476 into an address latch 502 (processing block 504). The sequence control 484 will then increment the address contained in the address counter 476 (processing block 506). Using the address contained in the address latch 502, the sequence control 484 then transfers the processing information contained in the ROM array 478 at the particular address location into a data latch 508 (processing block 510). Upon completion of the auto-incrementing procedure 500, the sequence control 484 will make sure that the flag is reset (processing block 512) and then generate the ready signal (processing block 498) to indicate to the CPU 12 that the ROM 48 is ready to receive the next ROM access request from the CPU 12.

If the subsequent ROM access request is a read (decision block 480) data (decision block 514) command, the sequence control 484 will transfer the processing information stored in the data latch 508 into an output latch 516 (processing block 518). If the page designation portion of the address contained in the address counter 476 corresponds to the unique page number assigned to the particular device at the time of manufacturing (decision block 520), a page select 522 will enable an output buffer 524 via a signal path 526 (processing block 528), to couple the processing information provided by the output latch 516 via an output bus 530 to the auxiliary bus 52. Thereafter, or if the page number does not correspond (decision block 520), the sequence control 484 will perform the auto-incrementing procedure 500, described above, make sure that the flag is reset (processing block 512), and generate the ready signal (processing block 498) to indicate that the requested data is available on the auxiliary bus 52.

In response to receiving a read (decision block 480) address (decision block 514) ROM access request, the sequence control 484 will transfer the 8 address bits contained in the upper 8 bit positions of the address counter 476 to the output latch 516 (processing block 532). The sequence control 484 will then enable the output buffer 524 (processing block 534) to couple the upper address byte provided by the output latch 516 via the output bus 530 to the auxiliary bus 52. The sequence control 484 then shifts the 8 address bits contained in the lower 8 bit positions of the address counter 476 into the upper 8 bit positions thereof (processing block 536). Thereafter, the sequence control 484 will make sure that the flag is reset (processing block 512), and will generate the ready signal (processing block 498) to indicate to the CPU 12 that the upper byte of the address is available on the auxiliary bus 52.

Upon receiving a subsequent read (decision block 480) address (decision block 514) command, the sequence control 484 will transfer the lower byte of the address, now in the upper 8 bit positions of the address counter 476, to the output latch 516 (processing block 532), and enable the output buffer 524 (processing block 534) to couple the lower address byte to the auxiliary bus 52. As before, the sequence control 484 will then shift the 8 bits contained in the lower bit positions of the address counter 476 into the upper 8 bits positions thereof (processing block 536), make sure that the flag is reset (processing block 512), and generate the ready signal (processing block 498) to indicate to the CPU 12 that the lower address byte is available on the auxiliary bus 52.

In response to receiving a write (decision block 480) date (decision block 482) ROM access request, the sequence control 484 will simply perform the auto-incrementing procedure 500, before resetting the flag (processing block 512) and generating the ready signal (processing block 498) to indicate completion of the command. Thus, the write data command is a convenient method for resetting the flag, while accomplishing an auto-incrementing operation.

In the preferred mode of operation, the CPU 12 initially issues a write data command, to reset the flag. The CPU 12 then provides a selected starting address via two consecutive write address commands. Thereafter, the ROM 48 will automatically provide the processing information contained at sequentially higher address locations in response to each subsequent read data command issued by the CPU 12. As part of the auto-incrementing procedure 500 performed in response to each read data command, the ROM 48 loads the data latch 508 with the next sequential byte so that it will be available for rapid transfer to the CPU 12. Thus, the CPU 12 spends a minimal amount of time waiting for the data after a read data command is issued.

DESCRIPTION OF THE COMMUNICATIONS SYSTEMS OPERATION

FIG. 5 illustrates the equipment required to use the preferred embodiment of the communication system of the present invention. A remote system 15, which may comprise a subscription data base system, or another digital computing system is connected via a signal path 17 to a modem 19. Modem 19 converts the signals from remote system 15 into signal types compatible with communications line 23. Communications line 23 is employed to connect the remote system 15 with the digital computing system 10. Modem 42 illustrated in FIG. 1b is composed of modem 41, which converts the signals on communications line 23 to the electrical signal type RS232, these signals being passed on signal path 43 to RS232 converter 45 and hence along I/O bus 24 to digital computing system 10. RS232 is an electrical standard for asynchronous digital communications. This set of electrical standards is widely used in commercially available modems which may be employed for modem 41 and thus RS232 converter 45 is employed to convert these standard signals to the signals required for I/O bus 24. In FIG. 5, digital computing system 10 is shown as comprised of computer main frame 11 and plug-in ROM module 54. It should be understood that communications line 23 may take the form of any convenient medium for two way communication and may include further pairs of modems for conversion of the signal type to a different signal type.

Plug-in ROM module 54 enables proper programming of digital computing system 10 for advantageous two way communication with the remote system 15. This communications process will be described in two parts, reception of communications from remote system 15 to digital computing system 10 and transmission of communications from digital computing system 10 to remote system 15. Although the reception of communications will be described first, it is understood that transmission and reception of communications between remote system 15 and digital computing system 10 can take place virtually simultaneously.

Initially, modem 41 and RS232 converter 45 are set for the communications characteristics required, such as baud rate, number of data bits, parity type, number of stop bits and duplex mode. Communications may begin once these data characteristics are set. In the preferred embodiment, once data characters are converted into the form readable on I/O bus 24 by RS232 converter 45, they are entered into a temporary buffer memory on an interrupt basis, that is, once a data character has been received and converted by RS232 converter 45, the programmed operation of CPU 12 is interrupted so that this data character may be stored in the temporary buffer memory. This process is illustrated in the flow chart of FIG. 6. If a character has been received (decision block 31), then the operation of CPU 12 is interrupted (processing block 33). Next, a write pointer is incremented (processing block 35) and the received character is stored in the temporary buffer memory (processing block 37) at the memory location indicated by the write pointer. Once the data character has been stored, the value of the write pointer indicates the position within the tempoary buffer memory at which the last received character has been stored. By entering received characters into the temporary buffer memory on an interrupt basis as described above, it is assured that digital computing system 10 is ready for receiving communications from remote system 15 at all times. This insures that no received data is lost because CPU 12 is busy performing other programmed tasks. The temporary buffer memory preferably takes the form of a circular interrupt buffer. This buffer is circularly addressed, that is, once the memory locations of the circular interrupt buffer are filled, the next received character is entered into the first memory location. As described in greater detail below, this circular interrupt buffer will be periodically checked to determine if any new characters have been written therein. The size of the circular interrupt buffer should be great enough to prevent loss of received characters by overflowing the capacity of the circular interrupt buffer while the CPU is performing other tasks between checking the buffer. In addition, the size of this circular interrupt buffer should be kept as small as possible so as to preserve random access memory locations for other uses. In the preferred embodiment, it has been found convenient to employ a circular interrupt buffer having 256 memory locations because a buffer of this size can be conveniently addressed by a single 8 bit byte. When incremented, this address byte provides an automatic carry over from decimal 255 to decimal 0, thereby automatically providing the required circular addressing.

Figure 7:
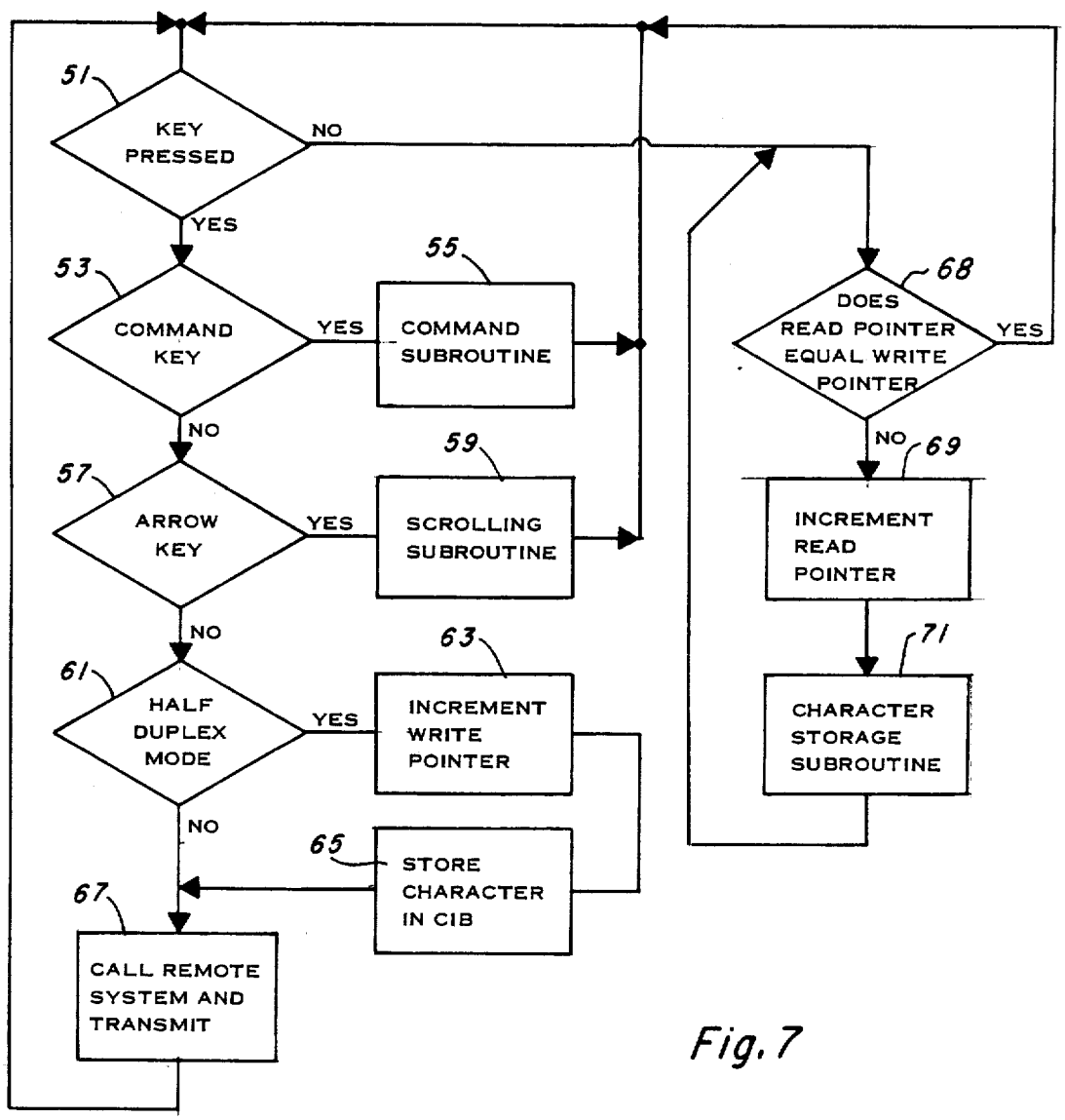
FIG. 7 is a flow chart illustrating the logical operation of the primary program of one embodiment of the terminal emulator.

The flow of operations within the main program for CPU 12 stored in plug-in ROM module 54 is illustrated in FIG. 7. The program begins with a test to determine whether a key from keyboard 28 noted in FIG. 1 has been pressed (decision block 51). If one of the keys of keyboard 28 has been pressed, the program determines whether it is a command key (decision block 53) or an arrow key (decision block 57). Upon the determination of the nature of the key pressed, either command subroutine 55 or scrolling subroutine 59 is executed. These subroutines will be described in further detail below. In the event that the key pressed is neither a command key nor an arrow key, the program tests to determine if the half duplex mode has been set (decision block 61). If so, the write pointer is incremented (processing block 63) and the character is stored in the circular interrupt buffer at the new location (processing block 65). This enables the user to view the entered character via the video display. The program then requires CPU 12 to transmit the appropriate character (processing block 67). In the event that a key has not been pressed, CPU 12 tests to determine whether a read pointer is equal to the write pointer (decision block 68). The read pointer is similar to the write pointer except that it indicates the last address read. If these pointers are equal, then no new characters have been stored in the circular interrupt buffer since the last character was read. In this case, the program returns to the beginning. If the read pointer does not equal the writer pointer, then CPU 12 increments the read pointer (decision block 69). Next, the character stored in the memory location within the circular interrupt buffer indicated by the read pointer is read out (processing block 71). This read out character will be stored in other memory locations in a manner which will be described in further detail below (also processing block 71). CPU 12 then retests the read and write pointers (decision block 68) and remains within this read out loop until the read and write pointers are equal, indicating that the last character written into the circular interrupt buffer has been read out. Thus, once it is determined that the last character written in the circular interrupt buffer has not been read out, CPU 12 reads out each of the characters written in the circular interrupt buffer since the last character read out before performing any other functions. This lock-up in the read out loop is provided because it is possible for the CPU 12 to remain within one of the subroutines 55 or 59 for a considerable period, during which period the circular interrupt buffer may be nearly filled with newly received characters. By remaining within the read out loop until each stored character has been read out, the possibility of losing data by exceeding the capacity of the circular interrupt buffer reduced.

Figure 8A:
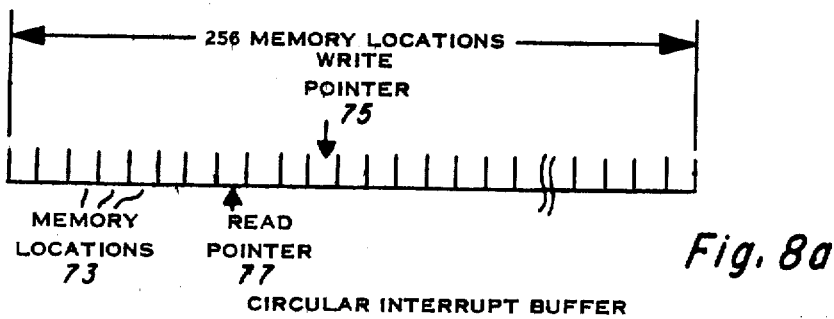
FIGS. 8a to 8c are illustration of the data format of data stored in the circular interrupt buffer, the display memory and the received line memory.
Figure 8B:
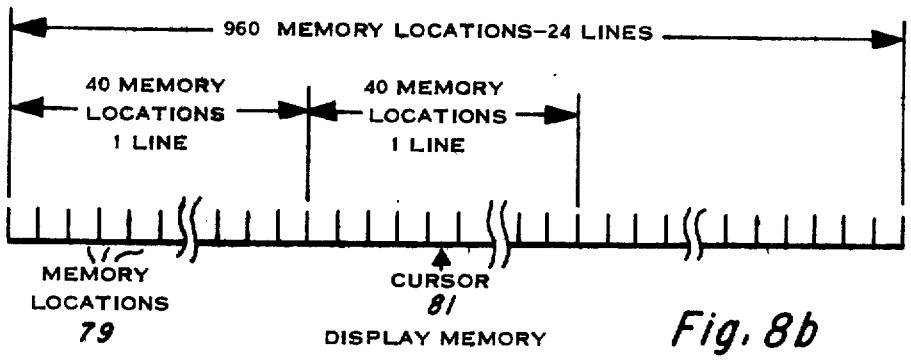
Figure 8C:
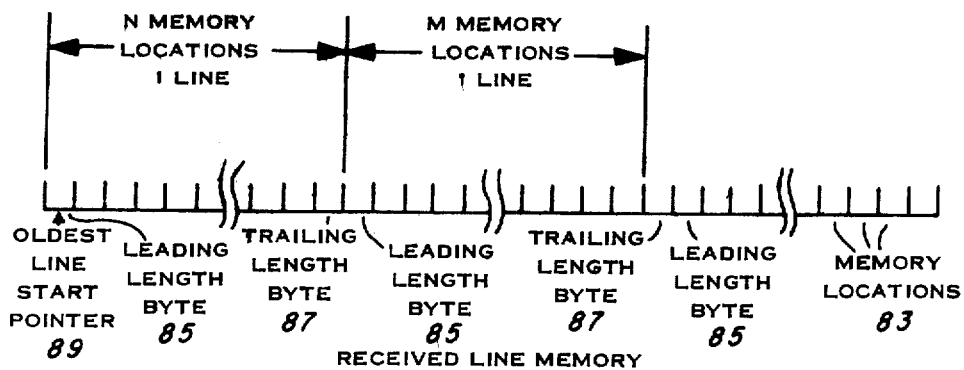

The terminal emulator enables division of RAM 56 into at least three separately defined memory areas. FIG. 8 illustrates the memory format of three separate memory means. FIG. 8a illustrates the data format in the previously mentioned circular interrupt buffer. As described above, the circular interrupt buffer includes 256 memory locations 73. FIG. 8a also schematically illustrates the write pointer 75 and the read pointer 77 which each indicates one of the 256 memory locations 73. FIG. 8b illustrates the organization of the display memory. The display memory has 960 memory locations 79. These memory locations 79 are organized into 24 groups of 40 memory locations each. Therefore each memory location 70 corresponds to one of the display locations in the monitor or TV receiver display which has 24 lines of 40 characters each. Curser 81 is illustrated schematically as indicating a particular memory location 79. The function of this curser 81 will be described in greater detail below. FIG. 8c illustrates the memory format of the received line memory. As explained in greater detail below, the line length within the received line memory is controlled by the transmitted line length from remote system 15. FIG. 8c illustrates a line of N memory locations 83 followed by a line of M memory locations 83. Note each line begins with a leading length byte 85 and ends with a trailing length byte 87. Also note that FIG. 8c schematically illustrates oldest line start position 89 which indicates the beginning of the line of N memory locations. The meanings of these terms and their use within the terminal emulator will be described in greater detail below.

Figure 9:
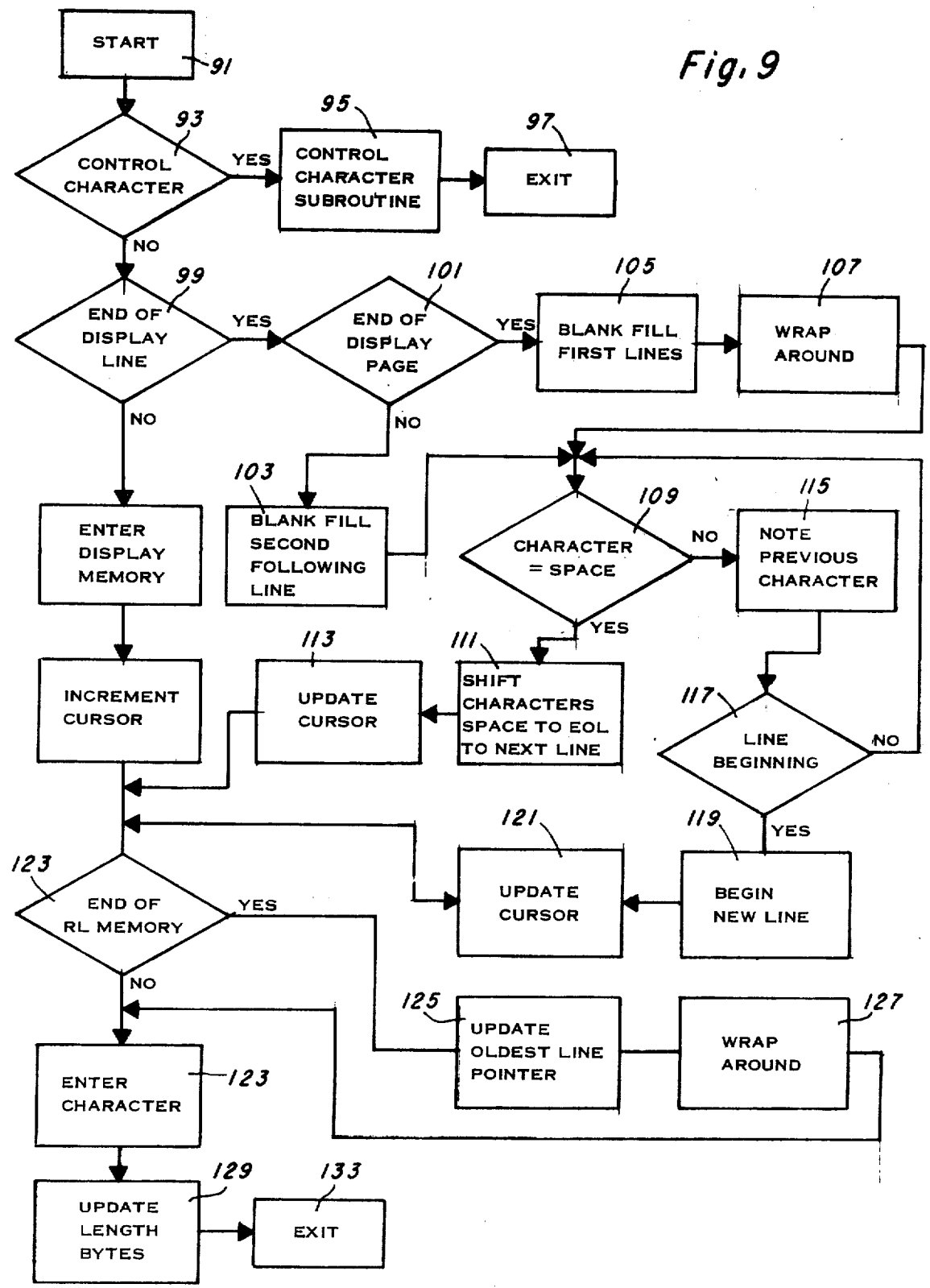
FIG. 9 is a flow chart illustrating the logical operation of the character storage subroutine of one embodiment of the terminal emulator.

In general, the data read from the circular interrupt buffer will be stored in both the display memory and the received line memory. The display memory corresponds to the pattern name table mentioned above in the explanation of the operation of the video display processor because it stores data characters corresponding to characters in the video display. FIG. 9 illustrates logic operations involved in one embodiment of the character storage subroutine 71 illustrated in FIG. 7.

A data communications system such as illustrated in FIG. 5 will usually employ the ASCII character set. The ASCII character set is a widely used set of alphanumeric and control characters employed in digital communication systems. This character set includes displayable characters, i.e., those characters which may appear in a video display such as employed in the present system and control characters which alert the receiving system to perform special functions. After a received character is read out of the circular interrupt buffer (processing block 71 of FIG. 7) the system determines whether or not it is a control character (decision block 93). If this character is not a control character, that is, if it is a displayable character, then the digital bits representing this character are entered into respective memory locations in the display memory and the received line memory in the manner set forth below. If it is determined that this character is a control character, then this control character must be decoded in order for the terminal emulator to take the proper action (processing block 95). Preferably, the terminal emulator will recognize the following control characters: start of header; bell; backspace; line feed; carriage return, form feed; and escape. Preferably, the terminal emulator would store a cursor character displayable as a solid block in the memory location within the display memory where the next received character is to be entered. This will have the effect of placing this solid block curser in the usual display at the position where the next received character is to be written. Once such a received character is entered into the display memory, the curser will be moved to the next following memory location. Thus, the curser serves as a visual indication to the operator of the portion of the video display where the next received characters will be written. Upon decoding a received start of header control signal, the curser should be moved to the first column of the first line and thereafter newly received characters should be written starting from the first character position in the first line. The bell character is used to activate an audio alarm to alert the operator of the receiving system. In the present invention, it is most advantageous for sound generator 66 to produce a tone signal in response to recognition of a received bell character. This tone signal is then outputted either through speaker 68 or through the audio system of the TV through RF modulator 64. The backspace character is employed in order to erase a character already received. When a backspace character is received, the curser is moved into the position of the last received character and the position where the curser was is blank filled. In the received line memory, the position of the last received character is replaced by the trailing length byte and both the leading and trailing length bytes are decremented to reflect the new line length. The carriage return character is employed to determine the line in which newly received characters are entered into the display memory and to determine the line length of characters stored in the received line memory. The display memory moves the cursor to the beginning of the following line and enters any newly received characters into the first position in the next line. In addition, the received line memory terminates the preceding line and starts a new line with new leading and trailing length bytes. When a line feed is received in combination with a carriage return character, either before of after, it is ignored. In case a line feed character is received alone, the present line of the received line memory is ended at its current length and a new line is defined which is blank filled with the same number of characters as the number of characters in the previous line. In the display memory a similar process occurs in that the present display line is blank billed and a new line is begun having the same number of beginning blank characters as the corresponding line in the received line memory. If the number of these blank characters is greater than 40, then they cannot all be entered into the same display memory line. In such a case, a wrap around occurs with the blank characters entered into the memory locations in the display memory corresponding to the next display line. Any further received characters are then entered into the present line starting at the current position of the cursor, i.e., after having a predetermined number of blanks at the beginning of that received line. In the case in which a carriage return character is received alone, the present line of the display memory is blank filled and the cursor is moved to the first position of the next line. In the received line memory, the present line is terminated and the new line is started. In the case in which the remote system 15 transmits a series of carriage return signals, indicating a series of blank lines, the received line memory stores a series of blank lines each having a leading length byte indicating one character, a blank or space character, and a trailing length byte indicating one character. Reception of a form feed character indicates that a new display page should be started. The entire display memory is blank filled and the cursor is moved to the first display location of the first line. Thereafter, any new characters are entered beginning from this first position of the first line of the display. A received escape character alerts the terminal emulator that a special coded function is to be sent by remote system 15. The nature of the specially coded function and the particular meaning ascribed to it by the terminal emulator must be pre-arranged in advance between the digital computing system 10 and the remote system 15. The terminal emulator of the present invention preferably includes at least one set of escape codes which enables the remote system 15 to control the foreground color and the background color of the display produced by video display processor 60. This change of color is preferably accomplished in the following manner. Once an escape character is received, the terminal emulator decodes the next received character as indicating a special function according to a predetermined code. The terminal emulator decodes a particular received character as indicating the next following received characters will specify the new foreground color and background color. The foreground color corresponds to the video color code associated with the pattern signal applied to priority selector 104 via pattern bus 102. The background color corresponds to the default video color code applied to priority selector 104 via default color bus 106.

The ordinary order of entering characters into the display memory is to begin with the memory location corresponding to the display location in the upper left hand corner of the display. Next, the memory locations corresponding to the upper line are filled from left to right. The memory location corresponding to the first column of the second line immediately follows the memory location corresponding to the last column of the first line. Then the second line is filled from left to right in the same manner as the first line and then wrapped around to the beginning of the third line. Thus, each line of the display is written in the manner that the video display would ordinarily be read. Because the number of columns of the transmitted lines may not correspond exactly to the number of columns within each line selected for the video display, this invention preferably includes an intelligent wrap function. This intelligent wrap function would serve to prevent the breakup of individual words upon wrap around at the end of a display line. This intelligent wrap function would ordinarily operate in the following manner. Received characters would be entered into the display memory in the order in which they are received until the memory locations corresponding to an entire display line are entered. Thus the subroutine tests to determine if the end of a display line (or more particularly the memory location corresponding to the end of a display line) is reached (decision block 99). The next character, that is, the forty-first character from the beginning of the line in the preferred embodiment, would be tested to determine whether it is a space or (decision block 109) blank. If this character is a space or blank, the next character, i.e., the forty-second character from the beginning of the line, would be entered into the display memory location corresponding to the first column of the next line (processing block 111). Thereafter, the cursor would be updated (procession block 113) and the next line would be filled in the normal manner. If the forty-first character after the beginning of the line is not a space, then an ordinary wrap around to the memory location corresponding to the first column of the next line would break up a word. The system would then search backwards (processing block 115) from the thirty-ninth column of the present line to detect the blank or space character nearest to the end of the line. Then, all characters after that space to the end of the line would be transferred to the memory locations corresponding to the beginning of the following line (processing block 111). The memory locations corresponding to the end of the present line where these characters were previously stored would then be blank filled. Later received characters would then be entered into memory locations corresponding to the next following display positions in the next line after the characters moved from the end of the previous line. In certain unusual circumstances, there may be no blanks within the entire forty character line of the video display. In such a case, subroutine would branch from decision block 117 to processing block 119, thus the forty-first received character is entered into the memory location corresponding to the beginning of the following line and the following line is filled in the same manner as the preceding line. In such a case, it is not possible to prevent breakup of the long word.

The terminal emulator would also preferably operate in a mode in which this intelligent wrap function is not employed. In the case in which the intelligent wrap is not employed, the memory locations of the display memory would be filled for each of the first 39 characters of each line. Thereafter, the 40th character in each line would be replaced by the last received character until the remote system terminates the line via a carriage return or line feed character. Then the next received character would be entered into the memory location corresponding to the beginning of the next line. The replacement of the final character in the line with the next received character within that transmitted line serves to indicate to the operator that characters are being received and that the wrap function is off. Ordinarily, data would be entered into the display memory with the wrap off only in the case in which the received data includes column information and the alignment of those columns would be disturbed by the wrap function. In such a case, the scrolling function (described in further detail below) would enable the operator to view a page size window, having the dimensions of the video display, of the actually received data.

Besides the above described line-to-line overlap, the display memory also has a page-to-page overlap. If the remote system is transmitting a large amount of data, eventually the memory locations of the display memory will be completely filled and the video display will be completely filled with received characters. In the event that the received data exceeds the capacity of the display memory (decision block 101), the first two lines of the display memory are blank filled (processing block 105) and the received characters are then stored in the memory locations corresponding to the first line (processing block 107). This serves to erase the oldest displayed data when replaced by the newly received data. When each new line of new data is ended, the next following line of old data is erased and blank filled (processing block 103). This serves to visually separate the old data below the blank line from the new data above the blank line.

The entry format into the received line memory differs from that into the display memory. Firstly, the received line memory has a large number of memory locations, larger than the number of memory locations in the display memory for entering characters received from remote system 15 as they are received. The received line memory has a variable line length, that is, the length of the character lines stored within the received line memory is controlled by the line length transmitted by remote system 15 rather than being controlled by the received line memory. These line lengths are determined by carriage return or line feed characters sent by remote system 15 in a manner which was described in greater detail above. Each stored line within the received line memory has length byte preceding the characters and a length byte after the characters. In the preferred embodiment, each line stored always has these two length bytes regardless of whether the remote system 15 has ended a transmitted line or not. When a new character is received, it is entered into the memory location following the memory location which stores the last received character (processing block 123). The trailing length byte is moved to the next following memory location after the received character and updated to reflect the new line length (processing block 129). Similarly, the preceding length byte is updated to reflect the new line length (also processing block 129). Characters are entered in this manner until remote system 15 transmits carriage return or line feed characters which terminate the line. The terminal emulator preferably also includes a feature which automatically terminates a line and begins a new line when the line length reaches 132 characters because the longest line length widely employed in digital communications is 132 characters.

When the received line memory is filled with characters received from remote system 15 (decision block 123), the received line memory undergoes a wrap around function similar to that of the display memory (processing block 127). To aid in memory control functions when such a memory wrap around occurs, the received line memory keeps an address pointer which identifies the location of the beginning of the oldest line stored. Assuming that remote system 15 transmits a greater number of characters than can be stored in the received line memory, newly received characters are stored in memory locations previously occupied by the oldest stored line. In such an event, the oldest line stored address pointer is changed to reflect the beginning of the next oldest stored line in order to prevent addressing of the newly stored data out of order or the addressing of any remaining portion of the oldest line stored when it is partially replaced by new characters (processing block 125). The system employs the leading and trailing length bytes in order to clearly identify the beginning and ending of each line. The provision of both leading and trailing length bytes simplifies the programming for working backward during scrolling. Memory wrap around in the received line memory (processing block 127) will occur less often than in the display memory because the received line memory has a greater number of memory locations than the display memory. In addition, use of variable length lines in the received line memory assures the best utilization of the available memory space.

The storage of the received characters in the received line memory enables the operator to view these received characters after reception has been completed. This later viewing of received data is accomplished using the scrolling function mentioned above. As mentioned above, the arrow keys on the keyboard provide the operator input for the scrolling function. The scrolling function differs somewhat when the wrap function is on from when the wrap function is off, therefore, the scrolling function will be described separately for each of these cases. When the wrap is on, the up and down arrows move the display lines up and down, respectively. When the displayed lines are moved up, the previously displayed top line is lost and a new line is entered into the vacated line at the bottom of the screen. Similarly, when the displayed lines are moved down, the bottom line is lost and a new data line is entered into the vacated top line. This wrap function moves the display line by line according to display lines with the intelligent wrap function on. That is, regardless of the fact that the received lines stored in the received line memory may be greater than the length of the lines displayed, the display changes according to displayed lines and not to the transmitted lines stored in the received line memory. The left and right arrows have no affect on the display when the wrap function is on, because all the data on the transmitted lines is formatted to fit within the display line. Pressing either the left or right arrow keys when the wrap function is on preferably causes the tone generator 66 to produce a beep tone to alert the operator that an illegal operation has been requested. When the wrap function is turned off, the arrow keys position the 24 line by 40 column display window at an operator controllable position within the lines as received. Thus, the up arrow enables display of those columns of the line following the last line previously displayed which are displayed in the lines appearing on the screen. Similarly, the down arrow enables display of that portion of the line above the first line on the display corresponding to the portions of the lines displayed. The right and left arrow keys enable the portion of the transmitted columns displayed to either be moved to the right or the left. Thus, the right arrow key causes the right column of each of the lines to be deleted and adds the column appearing before the first column previously displayed to the left hand column of the display. The left arrow key has a similar function in the opposite direction. As explained above, the display will be placed in a wrap off condition generally only for the case in which the remote system 15 has transmitted columnar data in which the column alignment would be lost using intelligent wrap or other similar situations. By employing the wrap off and the scrolling arrow keys in the manner set forth, the operator is able to view all of the data in its proper column alignment. In any case, if the operator selects a scrolling function which is invalid (that is, by pressing the down arrow when the first line received is already displayed or pressing the up arrow when the last line received in already displayed or a similar condition for the right and left arrows) then the terminal emulator preferably causes tone generator 66 to produce a beep tone to alert the operator that an invalid operation has been requested. This scrolling function, together with the storage of several pages of data within the received line memory permits advantageous reduction in the connect time between the remote system 15 and digital computing system 10. This reduction in the connection time is advantageous because many data base subscription services which would serve as remote system 15 charge on the basis of connect time.

The terminal emulator enables the operator to transmit from the digital computing system 10 to the remote system 15 via the keyboard 28. In accordance with the flow chart illustrated in FIG. 7, the keys pressed are transmitted to the remote system 15 one at a time. However, first the terminal emulator determines whether the key pressed is a command key (decision block 53). If this key pressed is a command key then the terminal emulator enters command subroutine 55. Pressing a command key alerts the digital computing system 10 that the operator wishes to command the system to perform a function rather than simply transmitting a digital character corresponding to a depressed key. The terminal emulator interprets the next depressed key as a command instruction. The computing system then takes the action indicated by the command instruction. This means may be employed to change other parameters such as determining whether an upper case or a lower case character is transmitted, or to enable the transmission of an ASCII control character in order to control the display mode of the remote system 15 determining whether the intelligent wrap function is on or off or transmission of a break signal to the remote system. This command sequence of a command key followed by a depressed key interpreted as a command instruction may also be used to select the local periphial device such as printer 36, disk unit 38 or magnetic tape unit 40 with which the terminal emulator will communicate. This communication with a local peripheral will be described in greater detail below. If the key pressed is not a command key, the main program then tests whether the key is an arrow key (decision block 57). If the key pressed is an arrow key, then the program enters the scrolling subroutine 59 which is described in further detail above. If the key pressed is neither a command key nor an arrow key, then it must be a transmittable ASCII character. In this case, the ASCII character is transmitted to the remote system (processing block 67).

As described above, the terminal emulator may operate in either a full duplex mode or a half duplex mode. It is well known that when operating digital asynchronous communications in a full duplex mode that the received system automatically echoes the transmitted character, that is, it sends the transmitted character back along the communications line to the original sending system. This two way transmission of the character serves an error detection function, because the original transmitting system receives confirmation that the transmitted character was correctly received. When the terminal emulator operates in the full duplex mode, the keys of keyboard 28 depressed are not entered into any memory of the digital computing system 10. Instead, the system awaits the return echoed character and then enters it into circular interrupt buffer in the manner of any other received character. This received character is stored and displayed in a manner like that fully described above. When the terminal emulator operates in a half duplex mode (decision block 61), ordinarily the remote system is then not expected to repeat the transmitted characters. In this case, the terminal emulator increments the write pointer (processing block 63) in a manner similar to the interrupt program during reception of transmitted characters and enters the transmitted character into the circular interrupt buffer (processing block 65). After having been entered into the circular interrupt buffer, these characters are displayed and stored in a like manner as received characters.

The terminal emulator also preferably includes programs for control of data transfer to and from local peripherals. Such programs should include program control for input and output to mass memory devices such as disk unit 38 and magnetic tape unit 40 as well as program control for output to a device such as printer 36. This program is illustrated in FIG. 10a. In order to enter data from a local peripheral, the terminal emulator must no longer be responsive to remote system 15 via communications line 23 but rather must be responsive only to signals appearing on I/O bus 24 (processing block 135). The program next requires the operator to specify the device so that this device may be properly addressed (processing block 137). The operator is required to enter the file name (processing block 141) if the specified device is disk unit 38 (decision block 139). One line of the data from the specified device is read (processing block 143) and then stored in the display memory (processing block 145) and the received line memory (processing block 147). This process is preferably accomplished by reading a line of the data provided by the specified device, storing this data in the circular interrupt buffer and incrementing the write pointer accordingly. Once this is done the data is entered into the display memory and the received line memory in the same manner as described above in relation to the reception of data from remote system. If the end of the specified file has been reached (decision block 149) then the program is exited (processing block 151). If the end of the file is not reached, the program checks to determine if the end of the received line memory has been reached (decision block 153). Preferably the end of the received line memory is signaled whenever the last stored input data character is less than 132 memory locations from the last available memory location. The figure 132 is used because it is the longest line length widely used in digital communications systems and because the data entry into the received line memory means automatically terminates a stored line and begins another line after 132 characters. When fewer than 132 memory locations remain it is not certain that an additional line can be entered without exceeding the memory capacity of the received line memory. If the end of the received line memory has not been reached, then the terminal emulator returns to read another line of data (processing block 143). If the end of the received line memory means has been reached, data input is stopped. The operator now has the option of scrolling through the data in the manner previously described. At this point, the operator has the option of exiting the program (processing block 157) or retrieving another display page of data (decision block 155). If a new data page is to be entered, this data is read from the mass memory device (processing block 159) and stored in the display memory and the received line memory (processing block 161). The data is entered into the display memory as described above. In the received line memory, the last number of whole lines of the first retrieved data is replaced by the newly retrieved data in a manner similar to the memory wrap around described above in relation to data received from remote system 15. Once this new page of data is stored, the operator may scroll the data and again has the option of exiting the program or retrieving another display page of data.

FIG. 10b illustrates the output program. In order to employ the output program a command sequence is entered via the keyboard by depressing the command key and then depressing the key which the terminal emulator recognizes as a command instruction to enter this program (processing block 163). The program then requires the operator to specify the peripheral device (processing block 165). If data is to be outputted to a local peripheral, the program checks to determine if the peripheral specified is a printer (decision block 167). If the selected device is a printer then an intelligent wrap is performed (processing block 167) on the data stored in the received line memory before transmission to the printer. The intelligent wrap is similar to the intelligent wrap employed for the display line memory, except for some minor changes. Because the line length already stored in the received line memory to known, the relation of the received line length to the line length of the printer line can be calculated before sending data to the printer. This is in contrast to the display memory intelligent wrap which was based on characters as they are received from remote system 15. After this intelligent wrap the lines are sent to the printer for printing (processing block 171). If the peripheral device is not a printer, then the lines are formatted for the device selected (processing block 173). Some devices such as disk unit 38, accept variable length lines in much the same manner as the received line memory and generate their own overhead such as line length characters. For these devices the lines are transmitted just as received, that is, omitting the leading and trailing length bytes but including a carriage return character at the end of each line. Other devices, such as a cassette tape recorder employed as magnetic tape unit 40, require the sending system to properly block the lines to correspond to a fixed format. Cassette tape recorders used as mass memory devices commonly require 64 character lines. Because the data sent must include length characters and may include lines of up to 132 characters, each received line is entered into three consecutive 64 character blocks with the unused remainder of these 192 character blocks blank filled. After the lines in the received line memory corresponding to one display page are sent, the operator has the option (decision block 175) of outputting another page in the same manner as before or the program may be exited (processing block 177).

Use of the terminal emulator for control of communications with remote system 15 and with local peripheral devices enables advantageous use of available memory and minimization of expense. If a small amount of data is to be received from remote system, it may be quickly stored in the received line memory thereby minimizing connect time to remote system 15 and reviewed at leisure employing the scrolling function. If a greater amount of data is to be received from remote system 15, this data may be entered into the received line memory up to its capacity and then stored in a local mass memory storage device such as a disk unit or a magnetic tape unit repeatedly until the required data is stored in the local mass memory storage device. This data stored in the local peripheral may be recalled and used without addressing the remote system 15 again. Lastly, data in the received line memory, from either a local mass memory storage device or from remote system 15, can be outputted to a local printer in an intelligent wrap made which prevents splitting of a word despite any differences in received line length and the print line length.

Although the present invention has been described in relation to a specific preferred embodiment, it will be clearly understood by those skilled in the art that other optional features may be included within the terminal emulator or substituted for features described without departing from the scope of the invention.

What is claimed is:

1. A plug-in communications control program module for use in a digital computing system including a central processing unit, a communications interface means, a memory means, a video display system and a plug-in type port for temporarily receiving a plug-in program control module, said plug-in communications control module comprising:
   a connector means connectable to said plug-in type port; and
   a solid state read only memory means having permanently stored therein a control program for interaction with said central processing unit of said digital computing system, said central processing unit and said plug-in communications control module together comprising (a) means for defining said memory means into at least a temporary data input buffer, a display memory means and a received line memory means having a greater size than said display memory means, (b) means for storing data characters received by said communications interface means in said temporary data input buffer, (c) means for periodically determining if at least one data character has been stored in said temporary data input buffer, (d) means for reading data characters out of said temporary data input buffer when it has been determined that at least one data character has been stored in said temporary data input buffer until all data characters stored in the temporary data input buffer have been read out, (e) means for storing data characters read out of said temporary data input buffer in said display memory means in a predetermined sequence, and (f) means for storing data characters read out of said temporary data input buffer in said received line memory means in sequential memory locations as said data characters are read out.

2. A communications control system comprising:
   a central processing unit for performing data processing functions under program control;
   a memory means including a temporary data input buffer, a display memory means having a plurality of memory locations for storing data characters therein and a received line memory means having a plurality of sequential memory locations, greater than the number of memory locations in said display memory means, for storing data characters therein;
   a communications interface means connectable to a communications line for receiving communications signals from said communications line and storing data characters corresponding to received communications signals in said temporary data input buffer;
   a video display means for displaying a matrix of alphanumeric characters corresponding to the data characters stored in said display memory means;
   a scrolling control means for receiving operator generated scrolling control signals;
   a plug-in type port; and
   a plug-in communications control module having a connector means connectable with said plug-in type port and a solid state read only memory means having a control program permanently stored therein, said central processing unit and said plug-in communications control module together comprising:
   (a) means for periodically determining if at least one character has been stored in the temporary data input buffer;
   (b) means for reading data characters out of the temporary data input buffer when it has been determined that at least one data character has been stored in the temporary data input buffer until the last data character stored in the temporary data input buffer has been read out;
   (c) means for storing data characters read out of said temporary data input buffer in the display memory means in a predetermined sequence;
   (d) means for storing data characters read out of said temporary data input buffer in the received line memory means in said sequence of memory locations as said data characters are read out; and
   (e) means for storing a subset of the data characters stored in the received line memory means in the display memory means, said subset being determined by said scrolling control signals.

3. A communications control system as claimed in claim 2, wherein said central processing unit and said plug-in communications control module together further includes:
  means for determining whether a data character read out of the temporary data input buffer corresponds to one of a plurality of control characters;
  said means for storing data characters read out of said temporary data input buffer in the display memory means includes means for altering said predetermined sequence when a data character read out of said temporary data input buffer is determined to correspond to a control character according to a predetermined code; and
  said means for storing data characters read out of said temporary data input buffer in the received line memory means includes means for storing special data characters in the received line memory means when a data character read out of said temporary data input buffer is determined to correspond to a control character according to said predetermined code.

4. A communications control system as claimed in claim 3, wherein:
  said means for storing data characters read out of said temporary data input buffer in the display memory means includes said predetermined sequence of storing read out data characters in memory locations corresponding to successive columns in a particular row of the matrix of the video display system until the last column in said particular row is reached, thereafter storing successively read out data characters in the memory location corresponding to the last column of said particular row by replacing said data character previously stored therein until a data character is determined to be control character indicative of the end of a line, and thereafter storing read out data characters in memory locations corresponding to the row following said particular row in the same manner as storage in memory locations corresponding to said particular row.

5. A communications control system as claimed in claim 3, wherein:
  said means for storing data characters read out of said temporary data input buffer in the display memory means includes said predetermined sequence of storing read out data characters in memory locations corresponding to successive columns in a particular row of the matrix of the video display system until either (a) a data character is determined to correspond to a control character indicative of the end of a line whereupon read out data characters are stored in memory locations corresponding to successive columns in the row following said particular row in the same manner as stored in memory locations corresponding to said particular row, or (b) the number of data characters from a reference data character indicative of a space to the next data character indicative of a space exclusive exceeds the number of columns in said particular row from said reference data character indicative of a space exclusive to the end of said particular row whereupon (i) data characters indicative of a space are stored in the memory location corresponding to columns in said particular row after said reference data character indicative of a space and (ii) data characters read out of said temporary data input buffer after said reference data character indicative of a space are stored in memory locations corresponding to successive columns of the row following said particular row in the same manner as storage in memory locations corresponding to said particular row.

6. A communications control system as claimed in claim 3, wherein:
  said means for storing data characters read out of said temporary data input buffer in the received line memory means further includes means for causing the central processing unit to store at least one line length data character indicative of received line length when a read out data character is determined to correspond to a control character indicative of the end of a line; and
  said means for storing a subset of data characters stored in said received line memory means in said display memory means determines said subset as the data characters stored in N contiguous memory locations within the received line memory means, where N is the number of columns in the matrix of the video display system, in each of M contiguous received lines within the received line memory means as defined by said at least one line length data character indicative of line length, where M is the number of rows in the matrix of the video display system, the particular N contiguous memory locations and the particular M contiguous lines being determined by the scrolling control signals.

7. A communications control system as claimed in claim 3, wherein:
  said means for storing data characters read out of said temporary data input buffer in the received line memory means further includes means for causing the central processing unit to store at least one line length data character indicative of received line length when a read out data character is determined to correspond to a control character indicative of the end of a line; and
  said means for storing a subset of data characters read out of said temporary data input buffer determines said subset as the data characters stored in contiguous memory locations within the received line memory means, whereby (a) data characters stored in memory locations within the received line memory means corresponding to the beginning of a received line as defined by said at least one line length data character indicative of line length are stored in memory locations with the display memory means corresponding to the first column of a row of the matrix of the video display system, and (b) data characters stored in successive memory locations within the received line memory means are stored in memory locations corresponding to successive columns in a particular row of the matrix of the video display system until either (i) the end of a received line is reached as indicated by said at least one line length data character indicative of received line length whereupon data characters indicative of a space are stored in the memory locations within the display memory means corresponding to remaining columns within said particular row, or (ii) the number of data characters in successive memory locations within the received line memory means from a reference data character indicative of a space to the next data character indicative of a space exclusive exceeds the number of columns in said particular row from said reference data character indicative of a space exclusive to the end of said particular row, whereupon data characters indicative of a space are stored in memory locations within the display memory means corresponding to columns in said particular row after said reference data character indicative of a space and data characters stored in sequential memory locations within the received line memory means following said reference data character indicative of a space are stored in memory locations within the display memory means corresponding to successive columns of the row following said particular row in the same manner as storage in memory locations corresponding to said particular row, said contiguous memory locations within the received line memory means being determined by the scrolling control signals.

8. A communications control system as claimed in claim 3, further comprising a printing means having a predetermined number of columns of print and wherein: said means for storing data characters read out of said temporary data input buffer in the received line memory means further includes means for storing at least one line length character indicative of received line length when a read out data character is determined to correspond to a control character indicative of the end of the line; and said central processing unit and said plug-in communications control module together further includes means for causing the printing means to print alphanumeric characters corresponding to data characters stored in said received line memory means in a sequence whereby (a) alphanumeric characters corresponding to data characters stored in memory locations within the received line memory means corresponding to the beginning of a line as defined by said at least one line length character are printed at the beginning of a print line, (b) alphanumeric characters corresponding to data characters stored in successive memory locations are printed in successive columns until either (i) the end of a received line is reached as defined by said at least one line length character whereupon no further alphanumeric characters are printed in that print line, or (ii) the number of data characters from a reference data character indicative of a space to the next data character indicative of a space exclusive exceeds the number of columns from the column corresponding to the reference data character indicative of a space exclusive to the end that particular print line whereupon no further alphanumeric characters are printed in that particular print line and alphanumeric characters corresponding to data characters stored in memory locations following said reference data character indicative of a space are printed in the print line following said particular print line in the same manner as printing of alphanumeric characters in said particular print line.

9. A communications control system as claimed in claim 2, further comprising a keyboard means for generating data characters indicative of alphanumeric characters, and wherein said central processing unit and said plug-in communications control module together further includes:
means for determining when the keyboard means generates a data character;
means for storing said generated data character in the temporary data input buffer; and
means for transmitting said generated data character to a remote system via said communications interface means and said communications line.

10. A communications control system as claimed in claim 2, further comprising a keyboard means for generating data characters indicative of alphanumeric characters, and wherein said central processing unit and said plug-in communications control module together further includes:
means for determining when the keyboard means generates a data character; and
means for transmitting said generated data character to a remote system via said communications interface means and said communications line.

11. A communications control system as claimed in claim 2, further comprising a mass memory storage means for storing lines of data characters therein, said central processing unit and said plug-in communications control module together further includes:
first means for storing a selected subset of the data characters stored in the received line memory in the mass memory storage means; and
second means for storing a selected subset of the lines of data characters stored in the mass memory means in the received line memory means.

12. A communications control system as claimed in claim 11, wherein:
said first means selects said subset as those data characters stored in lines of the received line memory means corresponding to lines of the display memory means.

13. A communications control system as claimed in claim 11, wherein:
said second means selects said subset by storing data characters from the mass memory means until the end of a line of data characters is within a predetermined number of memory locations of the end of the received line memory means and thereafter storing a predetermined number of lines of data characters from the mass memory means in the received line memory means in memory locations having the earliest stored data characters previously stored therein.

14. A digital communications system comprising:
a central processing unit for performing data processing functions under program control including an interrupt means for interrupting the performing of a program controlled function and performing a priority function;
a memory means including a circular interrupt buffer having a plurality of circularly sequential memory locations, a display memory means having a plurality of memory locations and a received line memory means having a plurality of memory locations, greater than the number of memory locations of said display memory means;
a video display means for displaying a matrix of alphanumeric characters corresponding to the data characters stored in said display memory means;
a plug-in type port;
a plug-in control module having a connector means connectable to said plug-in type port and a read only memory means including a control program permanently stored therein, said central processing unit and said plug-in control module together including (1) means for periodically determining if at least one data character has been stored in said circular interrupt buffer, (2) means for reading out data characters from said circular interrupt buffer one at a time in said circular sequence when it is determined that at least one data character has been stored in said circular interrupt buffer until the last data character stored in said circular interrupt buffer has been read out, (3) means for storing data characters read out of said circular interrupt buffer in said display memory means in a predetermined sequence, (4) means for storing data characters read out of said circular interrupt buffer in said received line memory means in said sequence of memory locations as said data characters are read out, and (5) means for storing a subset of the data characters stored in said received line memory means in said display memory means;

a communications interface means connected to said interrupt means of said central processing unit including (1) means for receiving an electrical signal from a communications transmission line, (2) means for generating a data character corresponding to said received electrical signal according to a predetermined code and (3) means for interrupting the program controlled function of said central processing unit and causing said central processing unit to perform the priority function of storing said generated data character in said circular interrupt buffer in a memory location after the memory location of the last stored data character according to said circular sequence; and a scrolling control means for receiving operator generated scrolling control signals, said scrolling control signals controlling said subset of data characters stored in said display memory means.

15. A digital communications system as claimed in claim 14, wherein:

said central processing unit and said plug-in control module together further includes means for determining whether a data character read out of said circular interrupt buffer corresponds to one of a plurality of control characters;

said means for storing data characters read out of said circular interrupt buffer in said display memory means includes means for altering said predetermined sequence when a read out data character is determined to correspond to a control character according to a predetermined code; and said means for storing data characters read out of said circular interrupt buffer in the received line memory means includes means for storing control data characters in said received line memory means when a data character is determined to correspond to a control character according to said predetermined code.

16. A digital communications system as claimed in claim 15, wherein:

said means for storing data characters read out of said circular interrupt buffer in said display memory means includes said predetermined sequence of storing read out data characters in memory locations corresponding to successive columns in a particular row of the matrix of said video display system until the last column in said particular row is reached, thereafter storing successively read out data characters in the memory location corresponding to the last column of said particular row by replacing said data character previously stored therein until a data character is determined to be a control character indicative of the end of a line, and thereafter storing read out data characters in memory locations corresponding to the row following said particular row in the same manner as storage in memory locations corresponding to said particular row.

17. A digital communications system as claimed in claim 15, wherein:

said means for storing data characters read out of said circular interrupt buffer in said display memory means includes said predetermined sequence of storing read out data characters in memory locations corresponding to successive columns in a particular row of the matrix of said video display system until either (a) a data character is determined to correspond to a control character indicative of the end of a line whereupon read out data characters are stored in memory locations corresponding to successive columns in the row following said particular row in the same manner as stored in memory locations corresponding to said particular row, or (b) the number of data characters from a reference data character indicative of a space to the next data character indicative of a space exclusive exceeds the number of columns in said particular row from said reference data character indicative of a space exclusive to the end of said particular row whereupon (i) data characters indicative of a space are stored in the memory location corresponding to columns in said particular row after said reference data character indicative of a space and (ii) data characters read out after said reference data character indicative of a space are stored in memory locations corresponding to successive columns of the row following said particular row in the same manner as stored in memory locations corresponding to said particular row.

18. A digital communications system as claimed in claim 15, wherein:

said means for storing data characters read out of said circular interrupt buffer in said received line memory means further includes means for storing at least on line length data character indicative of received line length when a read out data character is determined to correspond to a control character indicative of the end of a line; and said means for storing a subset of data characters stored in said received line memory means in said display memory means determines said subset as data characters stored in N contiguous memory locations with said received line memory means, where N is the number of columns in the matrix of said video display system, in each of M contiguous received lines within said received line memory means as defined by said at least one line length data character indicative of line length, where M is the number of rows in the matrix of said video display system, the particular N contiguous memory locations and the particular M contiguous lines being determined by said scrolling control signals.

19. A digital communications systems as claimed in claim 15, wherein:

said means for storing data characters read out of said circular interrupt buffer in said received line memory means further includes means for storing at least one line length data character indicative of received line length when a read out data character is determined to correspond to a control character indicative of the end of a line; and said means for storing a subset of data characters read out of said circular interrupt buffer determines said subset as data characters stored in contiguous memory locations within said received line memory means, whereby (a) data characters stored in memory locations within said received lne memory means corresponding to the beginning of a received line as defined by said at least one line length data character indicative of line length are stored in memory locations within said display memory means corresponding to the first column of a row of the matrix of said video display systems and (b) data characters stored in successive memory locations within said received line memory means are stored in memory locations corrsponding to successive columns in a particular row of the matrix of said video display system until either (i) the end of a received line is reached as indicated by said at least one line length data character indicative of received line length whereupon data characters indicative of a space are stored in the memory locations within said display memory means corresponding to remaining columns within said particular row, or (ii) the number of data characters in successive memory locations within said received line memory means from a reference data character indicative of a space to the next data character indicative of a space exlusive exceeds the number of columns in said said particular row from said reference data character indicative of a space exclusive to the end of said particular row, whereupon data characters indicative of a space are stored in memory locations within said display memory means corresponding to columns in said particular row after said reference data character indicative of a space and data characters stored in sequential memory locations within said received line memory means following said reference data characters indicative of a space are stored in memory locations within said display memory means corresponding to successive columns of the row following said particular row in the same manner as storage in memory locations corresponding to said particular row, said contiguous memory locations within said received line memory means being determined by said scrolling control signals.

20. A digital communication system as claimed in claim 15, further comprising a printing means having a predetermined number of columns of print and wherein:

said means for storing data characters read out of aid circular interrupt buffer in the received line memory means further includes means for causing the central processing unit to store at least one line length character indicative of receive line length when a read out data character is determined to correspond to a control character indicative of the end of the line; and said central processing unit and said plug-in control module together further comprises means for causing the printing means to print alphanumeric characters corresponding to data characters stored in said received line memory means in a sequence whereby (a) alphanumeric characters corresponding to data characters stored in memory locations within the received line memory means corresponding to the beginning of a line as defined by said at least one line length character are printed at the beginning of a print line, (b) alphanumeric characters corresponding to data characters stored in successive memory locations are printed in successive columns until either (i) the end of a received line is reached as defined by said at least one line length character whereupon no further alphanumeric characters are printed in that print line, or (ii) the number of data characters rom a reference data character indicative of a space to the next data character indicative of a space exclusive exceeds the number of columns from the column corresponding to the reference data character indicative of a space exclusive to the end of that particular print line whereupon no further alphanumeric characters are printed in that particular print line and alphanumeric characters corresponding to data characters stored in memory locations following said reference data character indicative of a space are printed in the print line following said particular print line in the same manner as printing of alphanumeric characters in said particular print line.

21. A digital communications systems as claimed in claim 14, further comprising a keyboard means for generating data characters indicative of alphanumeric characters, and wherein said central processing unit and said plug-in control module together further includes:

means for determining when said keyboard means generates a data character;

means for storing said generated data character in said circular interrupt buffer; and means for causing said central processing unit to transmit said generated data character to the communications transmission line.

22. A digital communications system claimed in claim 14, further comprising a keyboard means for generating data characters indicative of alphanumeric characters, and wherein said central processing unit and said plug-in control module together further includes:

means for determining when said keyboard means generates a data character; and means for transmitting said generated data character to the communication transmission line.

23. A digital communication system as claimed in claim 14, further comprising a mass memory storage means for storing lines of data characters therein, said central processing unit and said plug-in control module together further including:

first means for storing a selected subset of the data characters stored in the received line memory in the mass memory storage means; and second means for storing a selected subset of the lines of data characters stored in the mass memory means in the received line memory means.

24. A digital communications system as claimed in claim 23, wherein:

said first means selects said subset as those data characters stored in lines of the received line memory means corresponding to lines of the display memory means.

25. A digital communications system as claimed in claim 23, wherein:

said second means selects said subset by storing data characters from the mass memory means until the end on a line of data characters is within a predetermined number of memory locations of the end of the received line memory means and thereafter storing a predetermined number of lines of data characters from the mass memory means in the received line memory means in memory locations having the earliest stored data characters previously stored therein.

* * * * *